United States Patent [19]

Kramer et al.

[11] Patent Number: 5,879,436
[45] Date of Patent: Mar. 9, 1999

[54] AMINOSILANE SALTS AND SILANAMIDES OF CARBOXYLIC ACIDS AS CORROSION INHIBITORS

[75] Inventors: Andreas Kramer, Düdingen; Markus Frey, Marly, both of Switzerland; Adalbert Braig, Binzen, Germany

[73] Assignee: Ciba Specialty Chemicals Corporation, Tarrytown, N.Y.

[21] Appl. No.: 981,434

[22] PCT Filed: Jun. 17, 1996

[86] PCT No.: PCT/EP96/02600

§ 371 Date: Dec. 22, 1997

§ 102(e) Date: Dec. 22, 1997

[87] PCT Pub. No.: WO97/01606

PCT Pub. Date: Jan. 16, 1997

[30] Foreign Application Priority Data

Jun. 29, 1995 [CH] Switzerland ............. 1911/95

[51] Int. Cl.⁶ ............. C09D 5/08; C23F 11/14; C07F 7/18
[52] U.S. Cl. ............. 106/14.42; 106/14.41; 106/14.43; 252/389.32; 524/188; 556/413; 556/465; 556/466
[58] Field of Search ............. 106/14.41, 14.42, 106/14.43; 252/389.32; 524/188; 556/413, 465, 466

[56] References Cited

U.S. PATENT DOCUMENTS

| | | | |
|---|---|---|---|
| 4,048,206 | 9/1977 | Voronkor et al. ............. 556/405 |
| 4,909,987 | 3/1990 | Penninger et al. ............. 422/17 |
| 5,277,709 | 1/1994 | Armstrong et al. ............. 106/14.13 |
| 5,458,678 | 10/1995 | Armstrong et al. ............. 106/14.41 |
| 5,519,074 | 5/1996 | Kramer et al. ............. 524/99 |

FOREIGN PATENT DOCUMENTS

| | | |
|---|---|---|
| 0412933 | 2/1991 | European Pat. Off. . |
| 0496555 | 7/1992 | European Pat. Off. . |
| 0554023 | 8/1993 | European Pat. Off. . |
| 0619290 | 10/1994 | European Pat. Off. . |
| 2279344 | 1/1995 | United Kingdom . |

OTHER PUBLICATIONS

J.L. Speier, et al. J. Org. Chem. vol. 36(21), 3120–3126(1971).

L. Birkofer, et al., Chapter 10 in S. Patai, et al, Wiley & Sons, Ltd. 1989, pp. 657–751.

E. P. Pluddemann, "Silane Coupling Agents", Plenum Press 1982 (only pages of content summary).

Ullmann's Encyclopedia of Industrial Chemistry fifth Ed. vol. A21, 143–156 (1992).

Primary Examiner—Anthony Green
Attorney, Agent, or Firm—Luther A.R. Hall

[57] ABSTRACT

A description is given of salts and amides derived from (i) a polyacrylic acid, an acrylic acid-maleic acid copolymer or a carboxylic acid of formula (I), and (ii) an aminosilane of formula (V) which are useful as corrosion inhibitors in coating compositions for protecting metallic surfaces.

21 Claims, No Drawings

AMINOSILANE SALTS AND SILANAMIDES OF CARBOXYLIC ACIDS AS CORROSION INHIBITORS

The present invention relates to coating compositions comprising an organic film-forming binder, preferably a surface-coating material, and aminosilane salts and/or silanamides of carboxylic acids as corrosion inhibitors, to the use thereof in coating compositions for protecting metallic surfaces, and to novel aminosilane salts of carboxylic acids.

The use of alkali metal, alkaline earth metal, transition metal, ammonium and amine salts of carboxylic acids, and of transition metal complexes of ketocarboxylic acids, as corrosion inhibitors in aqueous systems is known and is described, for example, in U.S. Pat. No. 4,909,987, EP-A-0 412 933, EP-A-0 496 555, EP-A-0 554 023 or EP-A-0 619 290.

GB-A-2 279 344 describes carrier-bound ketocarboxylic acids as corrosion inhibitors in coating compositions for protecting metallic surfaces.

U.S. Pat. No. 3 773 607 discloses the preparation and use of silanamides as coupling agents for aglass fibres.

It has now been found that aminosilane salts and/or silanamides of carboxylic acids suppress the oxidation of metals, especially iron, and that at the same time they greatly improve the adhesion of the coating to metal in paints as well. These compounds are therefore suitable in coating compositions and as corrosion inhibitors as well as adhesion promoters.

The present invention therefore provides coating compositions comprising a) an organic film-forming binder and b) as corrosion inhibitor at least one salt (α) and/or at least one amide (β), both components (α) and (β) derived from i) a polyacrylic acid, an acrylic acid-maleic acid copolymer, or a carboxylic acid of the formula I

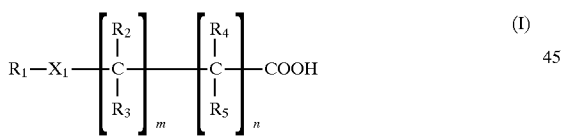

in which $R_1$ is hydrogen, $C_1$–$C_{25}$alkyl, $C_2$–$C_{25}$alkyl interrupted by oxygen or sulfur; $C_2$–$C_{24}$alkenyl, $C_4$–$C_{15}$cycloalkyl which is unsubstituted or substituted by $C_1$–$C_4$alkyl and/or carboxyl; $C_5$–$C_{15}$cycloalkenyl which is unsubstituted or substituted by $C_1$–$C_4$alkyl and/or carboxyl; $C_{13}$–$C_{26}$polycycloalkyl, $C_7$–$C_9$phenylalkyl which is unsubstituted or substituted on the phenyl ring by $C_1$–$C_4$alkyl; —$COR_6$, a 5- or 6-membered heterocyclic ring which is unsubstituted or substituted by $C_1$–$C_4$alkyl, $C_1$–$C_4$alkoxy, halogen or carboxyl; a 5- or 6-membered heterocyclic ring which is benzo-fused and is unsubstituted or substituted by $C_1$–$C_4$alkyl, $C_1$–$C_4$alkoxy, halogen or carboxyl; or else $R_1$ is a radical of the formula II, III or IV

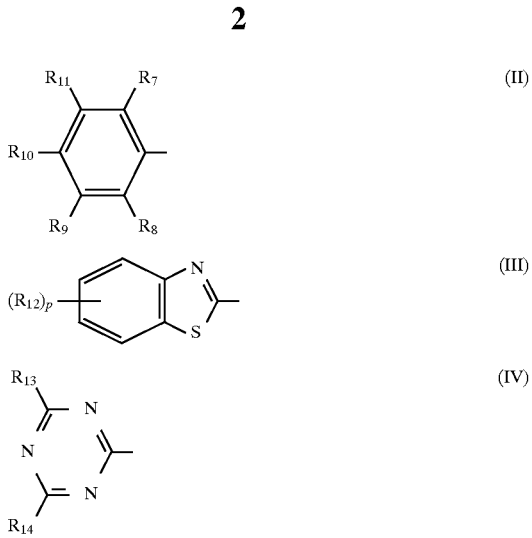

$R_2$, $R_3$, $R_4$ and $R_5$ independently of one another are hydrogen, hydroxyl, $C_1$–$C_{18}$alkoxy, $C_2$–$C_{18}$alkoxy which is interrupted by oxygen or sulfur; $C_1$–$C_{25}$alkyl, $C_2$–$C_{25}$alkyl which is interrupted by oxygen or sulfur; $C_2$–$C_{24}$alkenyl, $C_5$–$C_{15}$cycloalkyl which is unsubstituted or substituted by $C_1$–$C_4$alkyl; $C_5$–$C_{15}$cycloalkenyl which is unsubstituted or substituted by $C_1$–$C_4$allyl; phenyl or naphthyl which is unsubstituted or substituted by $C_1$–$C_4$alkyl; $C_7$–$C_9$phenylalkyl which is unsubstituted or substituted on the phenyl ring by $C_1$–$C_4$alkyl; $C_{10}$–$C_{12}$naphthylalkyl which is unsubstituted or substituted on the naphthyl ring system by $C_1$–$C_4$alkyl; or are —$COR_6$, with the proviso that, if one of the radicals $R_2$, $R_3$, $R_4$ and $R_5$ is hydroxyl, the other radical attached to the same carbon atom is other than hydroxyl; or else $R_2$ and $R_3$ or $R_4$ and $R_5$, together with the carbon atom to which they are attached, form an unsubstituted or $C_1$–$C_4$alkyl-substituted $C_5$–$C_{12}$cycloalkylidene ring, $R_6$ is hydroxyl, $C_1$–$C_{18}$alkoxy, $C_2$–$C_{18}$alkoxy which is interrupted by oxygen or sulfur; or

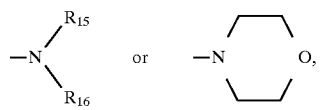

$R_7$, $R_8$, $R_9$, $R_{10}$ and $R_{11}$ independently of one another are hydrogen, hydroxyl, halogen, nitro, cyano, $CF_3$, —$COR_6$, $C_1$–$C_{25}$alkyl, $C_2$–$C_{25}$alkyl which is interrupted by oxygen or sulfur; $C_1$–$C_{25}$haloalkyl, $C_1$–$C_{18}$alkoxy, $C_2$–$C_{18}$alkoxy which is interrupted by oxygen or sulfur; $C_1$–$C_{18}$alkylthio, $C_2$–$C_{24}$alkenyl, $C_5$–$C_{15}$cycloalkyl which is unsubstituted or substituted by $C_1$–$C_4$alkyl; $C_5$–$C_{15}$cycloalkyl which is unsubstituted or substituted by $C_1$–$C_4$alkyl; phenyl or naphthyl which is unsubstituted or substituted by $C_1$–$C_4$alkyl; $C_7$–$C_9$phenylalkyl which is unsubstituted or substituted on the phenyl ring by $C_1$–$C_4$alkyl; $C_{10}$–$C_{12}$naphthylalkyl which is unsubstituted or substituted on the naphthyl ring system by $C_1$–$C_4$alkyl; phenoxy or naphthoxy which is unsubstituted or substituted by $C_1$–$C_4$alkyl; $C_7$–$C_9$phenylalkoxy which is unsubstituted or substituted on the phenyl ring by $C_1$–$C_4$alkyl; $C_{10}$–$C_{12}$naphthylalkoxy which is unsubstituted or substituted on the naphthyl ring system by $C_1$–$C_4$alkyl; or else the radicals $R_8$ and $R_9$ or the radicals $R_9$ and $R_{10}$ or the radicals $R_{10}$ and $R_{11}$ or the radicals $R_7$ and $R_{11}$, together with the carbon atoms to which they are attached, form an unsubstituted or $C_1$–$C_4$alkyl-, halogen- or $C_1$–$C_4$alkoxy-substituted benzo ring, with the proviso that at least one of the radicals $R_7$, $R_8$, $R_9$, $R_{10}$ and $R_{11}$ is hydrogen, $R_{12}$ is hydroxyl, halogen, nitro, cyano, $CF_3$, $C_1$–$C_{25}$alkyl, $C_2$–$C_{25}$alkyl which is interrupted by oxygen or sulfur; $C_1$–$C_{25}$haloalkyl, $C_1$–$C_{18}$alkoxy, $C_2$–$C_{18}$alkoxy which is interrupted by oxgyen or sulfur; $C_1$–$C_{18}$alkylthio or $C_2$–$C_{24}$alkenyl, $R_{13}$ and $R_{14}$ independently of one another are hydrogen, $C_1$–$C_{25}$alkyl, $C_1$–$C_{18}$alkoxy or —Y—$(CH_2)_s COR_6$, $R_{15}$ and $R_{16}$ independently of one another are hydrogen, $C_1$–$C_{25}$allyl, $C_3$–$C_{25}$alkyl which is interrupted by oxygen or sulfur; $C_2$–$C_{24}$alkenyl, $C_5$–$C_{15}$cycloalkyl which is unsubstituted or substituted by $C_1$–$C_4$alkyl; phenyl or naphthyl which is unsubstituted or substituted by $C_1$–$C_4$alkyl, $X_1$ is a direct bond, oxygen, sulfur

$C_1$–$_{18}$alkylene, $C_2$–$C_{18}$alkylene which is interrupted by oxygen or sulfur; $C_2$–$C_{18}$alkenylene, $C_2$–$C_{18}$alkynylene, $C_2$–$C_{20}$alkylidene, $C_7$–$C_{20}$phenylalkylidene or $C_5$–$C_8$cycloalkylene, with the proviso that, if m and n are 0, $X_1$ is other than oxygen and sulfur, Y is oxygen or

$R_a$ is hydrogen or $C_1$–$C_8$alkyl, m and n independently of one another are integers from 0 to 10, p is an integer from 0 to 4, s is an integer from 1 to 8, and ii) an aminosilane of the formula V

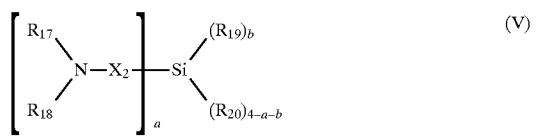

in which $R_{17}$ and $R_{18}$ independently of one another are hydrogen, $C_1$–$C_{25}$alkyl, 2-hydroxyethyl, $C_3$–$C_{25}$alkyl which is interrupted by oxygen or sulfur; $C_2$–$C_{24}$alkenyl or

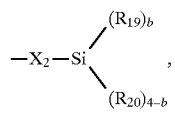

$R_{19}$ is $C_1$–$C_{25}$alkyl, $C_2$–$C_{25}$alkyl which is interrupted by oxygen or sulfur; hydroxyl, $C_1$–$C_{18}$alkoxy or $C_2$–$C_{24}$alkenyl, $R_{20}$ is hydroxyl, $C_1$–$C_{18}$alkoxy or $C_2$–$C_{18}$alkoxy which is interrupted by oxygen or sulfur; and, if a and b together are 1, three radicals $R_{20}$ together are $N(CH_2CH_2O$—$)_3$, $R_{21}$ is hydrogen or $C_1$–$C_8$alkyl, $X_2$ is $C_1$–$C_{18}$alkylene, $C_2$–$C_{20}$akylidene, $C_7$–$C_{20}$phenylalkylidene, $C_5$–$C_8$cycloalkylene, phenylene or naphthylene which is unsubstituted or substituted by $C_1$–$C_4$alkyl; or is $C_4$–$C_{18}$alkylene which is interrupted by oxygen, sulfur or

with the proviso that two nitrogen atoms are not attached to the same carbon atom, a is 1 or 2, and b is 0, 1 or 2.

Alkyl having up to 25 carbon atoms is a branched or unbranched radical such as, for example, methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, l, 1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. One of the preferred meanings of $R_1$, $R_2$, $R_3$, $R_4$, $R_5$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$ and $R_{19}$ is, for example, $C_1$–$C_{22}$allyl, especially $C_1$–$C_{20}$alkyl, e.g. $C_1$–$C_{18}$alkyl. A particularly preferred meaning of $R_2$, $R_3$, $R_4$, $R_5$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$ and $R_{19}$ is, for example, $C_1$–$C_{16}$alkyl, in particular $C_1$–$C_{12}$alkyl, e.g. $C_1$–$C_8$alkyl. A likewise particularly preferred meaning of $R_2$, $R_3$, $R_4$, $R_5$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$ and $R_{21}$ is, for example, $C_1$–$C_6$alkyl, in particular $C_1$–$C_4$alkyl, e.g. methyl or ethyl.

Alkyl having 2 to 25 carbon atoms which is interrupted by oxygen or sulfur can be interrupted one or more times and is for example $CH_3$—O—$CH_2$—, $CH_3$—S—$CH_2$—, $CH_3$—O—$CH_2CH_2$—O—$CH_2$—, $CH_3$—(O—$CH_2CH_2$—$)_2$O—$CH_2$—, $CH_3$—(O—$CH_2CH_2$—$)_3$O—$CH_2$— or $CH_3$—(O—$CH_2CH_2$—$)_4$O—$CH_2$—. A particularly preferred meaning of $R_1$, $R_2$, $R_3$, $R_4$, $R_5$, $R_7$, $R_8$, $R_9$, $R_{10}$, $R_{11}$, $R_{12}$ and $R_{19}$ is, for example, $C_2$–$C_{18}$alkyl interrupted by oxygen or sulfur, in particular $C_4$–$C_{18}$alkyl interrupted by oxygen, e.g. $C_4$–$C_{12}$alkyl interrupted by oxygen.

Alkyl having 3 to 25 carbon atoms which is interrupted by oxygen or sulfur can be interrupted one or more times and is, for example, $CH_3$—O—$CH_2CH_2$—, $CH_3$—S—$CH_2CH_2$—, $CH_3$—O—$CH_2CH_2$—O—$CH_2CH_2$—, $CH_3$—(O—$CH_2CH_2$—$)_2$O—$CH_2CH_2$—, $CH_3$—(O—$CH_2 CH_2$—$)_3$ O—$CH_2CH_2$— or $CH_3$—(O—$CH_2CH_2$—$)_4$O—$CH_2CH_2$—. Preferred radicals $R_{15}$, $R_{16}$, $R_{17}$ and $R_{18}$ are those in which the carbon atom attached to the nitrogen atom is not attached simultaneously to an additional oxygen atom or sulfur atom. A particularly preferred meaning of $R_{15}$, $R_{16}$, $R_{17}$ and $R_{18}$ is, for example, $C_3$–$C_{18}$alkyl which is interrupted by oxygen or sulfur, in particular $C_3$–$C_{18}$alkyl which is interrupted by oxygen, e.g. $C_3$–$C_{12}$alkyl which is interrupted by oxygen.

Alkenyl having 2 to 24 carbon atoms is a branched or unbranched radical such as, for example, vinyl, propenyl, 2-butenyl, 3-butenyl isobutenyl, n-2,4pentadienyl, 3-methyl-2-butenyl, n-2-octenyl, n-2-dodecenyl, isododecenyl, oleyl, n-2-octadecenyl or n4-octadecenyl. A particularly preferred meaning of $R_1$, $R_2$, $R_3$, $R_4$, $R_5$, $R_7$, Rs, R$_9$, RIO, R$_{11}$, R$_{12}$, R$_{15}$, R$_{16}$, R$_{17}$, R$_{18}$ and R$_{19}$ is alkenyl having 3 to 18 carbon atoms, in particular 3 to 12 carbon atoms, e.g. 3 to 10 carbon atoms.

$C_4$–$C_{15}$Cycloalkyl, especially $C_5$–$C_{15}$cycloalkyl, which is unsubstituted or substituted by $C_1$–$C_4$alkyl and/or carboxyl and which contains preferably 1 to 3, in particular 1 or 2, branched or unbranched alkyl group radicals and/or 1 or 2 carboxyl groups, is, for example, cyclopentyl, methylcyclopentyl, dimethylcyclopentyl, cyclohexyl, 2-carboxycyclohexyl, 3-carboxycyclohexyl, methylcyclohexyl, dimethylcyclohexyl, trimethylcyclohexyl, tert-butylcyclohexyl, cycloheptyl, cyclooctyl or cyclododecyl. A preferred meaning of R$_1$ is, for example, the $C_4$–$C_{12}$cycloalkyls which occur in naphthenic acid [J. Buckingham, Dictionary of Organic Compounds, Vol. 4, page 4152, 5th Edition (1982)]. A particularly preferred meaning of R$_2$, R$_3$, R$_4$, R$_5$, R$_7$, R$_8$, R$_9$, R$_{10}$, R$_{11}$, R$_{15}$ and R$_{16}$ is $C_5$–$C_{12}$cycloalkyl, in particular $C_5$–$C_8$cycloalkyl, e.g. cyclohexyl.

$C_5$–$C_{15}$Cycloalkenyl which is unsubstituted or substituted by $C_1$–$C_4$alkyl and/or carboxyl and which preferably contains 1 to 3, in particular 1 or 2, branched or unbranched alkyl group radicals and/or 1 or 2 carboxyl groups, is, for example, cyclopentenyl, methylcyclopentenyl, dimethylcyclopentenyl, cyclohexenyl, 2-carboxycyclohexenyl, 3-carboxycyclohexenyl, 2-carboxy-4-methylcyclohexenyl, methylcyclohexenyl, dirnethylcyclohexenyl, trimethylcyclohexenyl, tert-butylcyclohexenyl, cycloheptenyl, cyclooctenyl or cyclododecenyl. It is preferably $C_5$–$C_{12}$cycloalkenyl, in particular $C_5$–$C_{18}$cycloalkenyl, e.g. cyclohexenyl.

$C_{13}$–$C_{26}$Polycycloalkyl is, for example, the $C_{13}$–$C_{26}$polycycloalkyls which occur in naphthenic acid [J. Buckingham, Dictionary of Organic Compounds, Vol. 4, page 4152, 5th Edition (1982)].

$C_7$–$C_9$Phenylalkyl which is unsubstituted or substituted on the phenyl radical by $C_1$–$C_4$alkyl and which preferably contains 1 to 3, in particular 1 or 2, branched or unbranched alkyl group radicals is, for example, benzyl, α-methylbenzyl, α,α-dimethylbenzyl 2-phenylethyl, 2-methylbenzyl, 3-methylbenzyl, 4methylbenzyl, 2,4-dimethylbenzyl, 2,6-dimethylbenzyl or 4-tert-butylbenzyl. Benzyl is preferred.

A 5- or 6-membered heterocyclic ring which is unsubstituted or substituted by $C_1$–$C_4$alkyl, $C_1$–$C_4$alkoxy, halogen or carboxyl and which preferably contains 1 to 3, in particular 1 or 2, branched or unbranched alkyl or alkoxy group radicals, and preferably 1 to 3, in particular 1 or 2, heteroatoms from the group consisting of nitrogen, oxygen and sulfur is, for example, thienyl, 2-methylthienyl, 3-chlorothienyl, 3-methoxythienyl, tetrahydrofuranyl, furyl, pyrrolidinyl, 1-methylpyrrolidinyl, pyrrolyl, thiazolyl, isothiazolyl, imidazolyl, carboxyimidazolyl, triazolyl, tetrazolyl, oxazolyl, isoxazolyl, pyridyl, piperidinyl, morpholinyl, pyrazinyl, carboxypyrazinyl, piperazinyl, triazinyl or 2,6-dimethoxytriazonyl.

A 5- or 6-membered heterocyclic ring which is unsubstituted or substituted by $C_1$–$C_4$alkyl, $C_1$–$C_4$alkoxy, halogen or carboxy and is benzo-fused, which preferably contains 1 to 3, in particular 1 or 2, branched or unbranched alkyl or alkoxy group radicals and preferably 1 to 3, in particular 1 or 2, heteroatoms from the group consisting of nitrogen, oxygen and sulfur is, for example, benzothiazolyl, 5-chlorobenzothiazolyl, 5-methoxybenzothiazolyl, 5-methylbenzothiazolyl, benzoimidazolyl, benzooxazolyl, benzoisothiazolyl or benzothienyl.

Alkoxy having up to 18 carbon atoms is a branched or unbranched radical such as, for example, methoxy, ethoxy, propoxy, isopropoxy, n-butoxy, isobutoxy, pentoxy, isopentoxy, hexoxy, heptoxy, octoxy, decyloxy, tetradecyloxy, hexadecyloxy or octadecyloxy. $C_1$–$C_2$alkoxy is preferred, in particular $C_1$–$C_{10}$alkoxy, e.g. $C_1$–$C_8$alkoxy. A particularly preferred meaning of R$_2$, R$_3$, R$_4$, R$_5$, R$_6$, R$_7$, R$_8$, R$_9$, R$_{11}$, R$_{12}$, R$_{13}$, R$_{14}$, R$_{19}$ and R$_{20}$ is $C_1$–$C_6$alkoxy, in particular $C_1$–$C_4$alkoxy, e.g. methoxy or ethoxy.

$C_2$–$C_{18}$Alkoxy which is interrupted by oxygen or sulfur is, for example, CH$_3$—O—CH$_2$CH$_2$O—, CH$_3$—S—CH$_2$CH$_2$O—, CH$_3$—O—CH$_2$CH$_2$—O—CH$_2$CH$_2$O—, CH$_3$—S—CH$_2$CH$_2$—S—CH$_2$CH$_2$O—, CH$_3$—S—CH$_2$CH$_2$—O—CH$_2$CH$_2$O—CH$_3$—(O—CH$_2$CH$_2$—)$_2$O—CH$_2$CH$_2$O—, CH$_3$—(O—CH$_2$CH$_2$—)$_3$O—CH$_2$CH$_2$O— or CH$_3$—(O—CH$_2$CH$_2$—)$_4$O—CH$_2$CH$_2$—.

Phenyl or naphthyl substituted by $C_1$–$C_4$alkyl, which preferably contains 1 to 3, in particular 1 or 2, alkyl groups, is, for example, o-, m- or p-methylphenyl 2,3-dimethylphenyl, 2,4-dimethylphenyl, 2,5-dimethylphenyl, 2,6-dimethylphenyl, 3,4dimethylphenyl, 3,5-dimethylphenyl, 2-methyl-6-ethylphenyl, 4tert-butylphenyl, 2-ethylphenyl, 2,6-diethylphenyl, 1-methylnaphthyl, 2-methylnaphthyl, 4-methylnaphthyl, 1,6-dimethylnaphthyl or 4-tert-butylnaphthyl.

$C_{10}$–$C_{12}$Naphthylalkyl which is unsubstituted or substituted on the naphthyl ring system by $C_1$–$C_4$alkyl and which preferably contains 1 to 3, in particular 1 or 2, branched or unbranched alkyl group radicals is, for example, naphthylmethyl, α-methylnaphthylmethyl, α,α-dimethylnaphthylmethyl, naphthylethyl, 2-methyl-1-naphthylmethyl, 3-methyl-1-naphthylmethyl, 4-methyl-1-naphthylmethyl, 2,4-dimethyl-1-naphthylmethyl, 2,6-dimethyl-1-naphthylmethyl or 4-tert-butyl-1-naphthylmethyl.

An unsubstituted or $C_1$–$C_4$alkyl-substituted $C_5$–$C_{12}$cycloalkylidene ring which preferably contains 1 to 3, in particular 1 or 2, branched or unbranched alkyl group radicals is, for example, cyclopentylidene, methylcyclopentylidene, dimethylcyclopentylidene, cyclohexylidene, methylcyclohexylidene, dimethylcyclohexylidene, trimethylcyclohexylidene, tert-butylcyclohexylidene, cycloheptylidene, cyclooctylidene, cyclodecylidene or cyclododecylidene. Preference is given to cyclohexylidene and tert-butylcyclohexylidene.

Halogen is chlorine, bromine or iodine, for example, preferably chlorine.

Haloalkyl having up to 25 carbon atoms is a branched or unbranched radical such as, for example, chloromethyl, chloroethyl, chloropropyl, chlorobutyl or 3-chloro-1-butyl. A preferred meaning of R$_7$, R$_8$, R$_9$, R$_{10}$, R$_{11}$ and R$_{12}$ is, for example, $C_1$–$C_{18}$haloalkyl, in particular $C_1$–$C_{12}$haloalkyl, e.g. $C_1$–$C_8$haloalkyl.

Alkylthio having up to 18 carbon atoms is a branched or unbranched radical such as, for example, methylthio, ethylthio, propylthio, isopropylthio, n-butylthio, isobutylthio, pentylthio, isopentylthio, hexylthio, heptylthio, octylthio, decylthio, tetradecylthio, hexadecylthio or octadecylthio. Alkylthio having 1 to 12 carbon atoms is preferred, in particular 1 to 8 carbon atoms, e.g. 1 to 6 carbon atoms.

$C_1$–$C_4$Alkyl-substituted phenoxy or naphthoxy, which preferably contains 1 to 3, in particular 1 or 2, alkyl groups, is for example o-, m- or p-methylphenoxy, 2,3-dimethylphenoxy, 2,4dimethylphenoxy, 2,5-dimethylphenoxy, 2,6-dimethylphenoxy, 3,4dimethylphenoxy, 3,5-dimethylphenoxy, 2-methyl-6-ethylphenoxy, 4-tert-butylphenoxy, 2-ethylphenoxy, 2,6-diethylphenoxy, 1-methylnaphthoxy, 2-methylnaphthoxy, 4-methylnaphthoxy, 1,6-dimethylnaphthoxy or 4-tert-butylnaphthoxy.

$C_7$–$C_9$Phenylalkoxy which is unsubstituted or substituted on the phenyl ring by $C_1$–$C_4$alkyl, and preferably contains 1 to 3, in particular 1 or 2, branched or unbranched allyl group radicals, is for example benzyloxy, 2-phenylethoxy, 2-methylbenzyloxy, 3-methylbenzyloxy, 4-methylbenzyloxy, 2,4-dimethylbenzyloxy, 2,6-dimethylbenzyloxy or 4-tert-butylbenzyloxy. Benzyloxy is preferred.

$C_{10}$–$C_{12}$Naphthylalkoxy which is unsubstituted or substituted on the naphthyl ring system by $C_1$–$C_4$alkyl, and preferably contains 1 to 3, in particular 1 or 2, branched or unbranched alkyl group radicals, is for example naphthylmethoxy, naphthylethoxy, 2-methyl-1-naphthylmethoxy, 3-methyl-1-naphthylmethoxy, 4-methyl-1-naphthylmethoxy, 2,4-dimethyl-1-naphthylmethoxy, 2,6-dimethyl-1-naphthylmethoxy or 4-tert-butyl-1-naphthylmethoxy.

$C_1$–$C_{18}$Alkylene is a branched or unbranched radical such as, for example, methylene, ethylene, propylene, tetramethylene, pentamethylene, hexamethylene, heptamethylene, octamethylene, decamethylene, dodecamethylene or octadecamethylene. A preferred meaning of $X_1$ is, for example, $C_1$–$C_{12}$alkylene, in particular $C_1$–$C_{10}$alkylene, e.g. $C_1$–$C_8$alkylene. A preferred meaning of $X_2$ is, for example; $C_2$–$C_{12}$alkylene, in particular $C_2$–$C_{10}$alkylene, e.g. $C_2$–$C_8$alkylene. An especially preferred meaning of $X_2$ is, for example, $C_2$–$C_6$alkylene, in particular $C_2$–$C_4$alkylene, e.g. propylene.

$C_2$–$C_{18}$Alkylene which is interrupted by oxygen or sulfur can be interrupted one or more times and is for example —CH$_2$—O—CH$_2$—, —CH$_2$—S—CH$_2$—, —CH$_2$—NH—CH$_2$—, —CH$_2$—O—CH$_2$CH$_2$—O—CH$_2$—, —CH$_2$—(O—CH$_2$CH$_2$—)$_2$O—CH$_2$—, —CH$_2$—(O—CH$_2$CH$_2$—)$_3$O—CH$_2$—, —CH$_2$—(O—CH$_2$CH$_2$—)$_4$O—CH$_2$— or —CH$_2$CH$_2$—S—CH$_2$CH$_2$—. A preferred meaning of $X_1$ is, for example, $C_2$—$C_{18}$alkylene interrupted by oxygen, in particular $C_4$—$C_{18}$alkylene interrupted by oxygen, e.g. $C_4$–$C_{12}$alkylene interrupted by oxygen.

$C_4$–$C_{18}$Alkylene interrupted by oxygen, sulfur or

can be interrupted one or more times and is for example —CH$_2$CH$_2$—NH—CH$_2$CH$_2$—, —CH$_2$CH$_2$—N(CH$_3$)—CH$_2$CH$_2$—, —CH$_2$CH$_2$—NH—CH$_2$CH$_2$CH$_2$—, —CH$_2$CH$_2$—S—CH$_2$CH$_2$—, —CH$_2$CH$_2$—O—CH$_2$CH$_2$—O—CH$_2$CH$_2$—, —CH$_2$CH$_2$NH—CH$_2$CH$_2$—NH—CH$_2$CH$_2$CH$_2$—, —CH$_2$CH$_2$—(O—CH$_2$CH$_2$—)$_2$O—CH$_2$CH$_2$—, —CH$_2$CH$_2$—(O—CH$_2$CH$_2$—)$_3$O—CH$_2$CH$_2$— or —CH$_2$CH$_2$—(O—CH$_2$CH$_2$—)$_4$O—CH$_2$CH$_2$—. A referred meaning of $X_2$ is, for example, $C_4$–$C_{12}$alkylene interrupted by oxygen, sulfur or

in particular $C_4$–$C_{12}$alkylene interrupted by

e.g. $C_4$–$C_{12}$alkylene interrupted by

$C_2$–$C_{18}$Alkenylene is for example vinylene, methylvinylene, octenylethylene or dodecenylethylene. $C_2$–$C_{12}$Alkenylene is preferred, especially $C_2$–$C_8$alkenylene. A particularly preferred meaning of $X_1$ is $C_2$–$C_4$alkenylene, especially vinylene.

$C_2$–$C_{18}$Alkenylene is for example —C≡C—, 2-propynylene (—C≡C—CH$_2$—), 2-butynylene (—CH$_2$—C≡C—CH$_2$—), 2-pentynylene, 2-hexynylene, 3-hexynylene, 3-heptynylene, 2-decynylene, 4-decynylene or 8-octadecynylene. A preferred meaning of $X_1$ is $C_2$–$C_{12}$alkynylene, in particular $C_2$–$C_8$alkynylene, e.g. 2-butynylene.

Alkylidene having 2 to 20 carbon atoms is for example ethylidene, propylidene, butylidene, pentylidene, 4-methylpentylidene, heptylidene, nonylidene, tridecylidene, nonadecylidene, 1-methylethylidene, 1-ethylpropylidene or 1-ethylpentylidene. A preferred meaning of $X_1$ and $X_2$ is, for example, alkylidene having 2 to 16 carbon atoms, in particular 2 to 12 carbon atoms, e.g. 2 to 8 carbon atoms.

Phenylallidene having 7 to 20 carbon atoms is for example benzylidene, 2-phenylethylidene or 1-phenyl-2-hexylidene. A preferred meaning of $X_1$ and $X_2$ is, for example, phenylalkylidene having 7 to 16 carbon atoms, in particular 7 to 12 carbon atoms, e.g. 7 to 9 carbon atoms.

$C_5$–$C_9$Cycloalkylene is a saturated hydrocarbon group having two free valences and at least one ring unit and is, for example, cyclopentylene, cyclohexylene, cycloheptylene or cyclooctylene. Cyclohexylene is preferred.

Unsubstituted or $C_1$–$C_4$alkyl-substituted phenylene or naphthylene is for example 1,2-, 1,3-, 1,4phenylene, 1,2-, 1,3-, 1,4-, 1,6-, 1,7-, 2,6- or 2,7-naphthylene. 1,4-Phenylene is preferred.

The novel component (β) is understood to refer to amides of the formula VIa or VIb

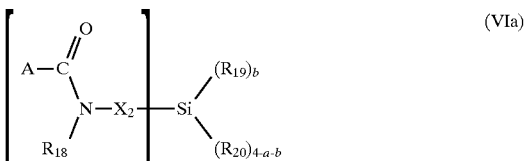

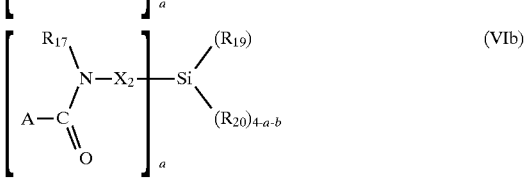

in which

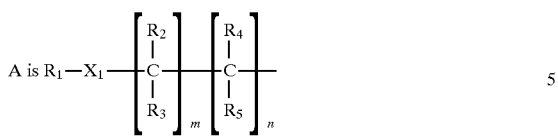

or, for example, the polymeric part of polyacrylic acid.

Coating compositions to be mentioned in particular are those comprising as component (b) a salt and/or an amide derived from i) a polyacrylic acid, an acrylic acid-maleic acid copolymer or a carboxylic acid of the formula I and ii) an aminosilane of the formula V in which $R_1$ is $C_1$–$C_{25}$alkyl, $C_2$–$C_{18}$alkyl which is interrupted by oxygen or sulfur; $C_2$–$C_{18}$alkenyl, $C_5$–$C_{12}$cycloalkyl which is unsubstituted or substituted by $C_1$–$C_4$alkyl and/or carboxyl; $C_5$–$C_{12}$cycloalkenyl which is unsubstituted or substituted $C_1$–$C_4$alkyl and/or carboxyl; $C_{13}$–$C_{26}$polycycloalkyl, $C_7$–$C_9$phenylalkyl, —$COR_6$ or a radical of the formula II, III or IV

$R_2$, $R_3$, $R_4$ and $R_5$ independently of one another are hydrogen, hydroxyl, $C_1$–$C_{12}$alkoxy, $C_2$–$C_{12}$alkoxy which is interrupted by oxygen or sulfur; $C_1$–$C_{18}$alkyl, $C_2$–$C_{18}$alkyl which is interrupted by oxygen or sulfur; $C_2$–$C_{18}$alkenyl, $C_5$–$C_{12}$cycloalkyl, $C_5$–$C_{12}$cycloalkenyl, phenyl, naphthyl, $C_1$–$C_9$phenylalkyl, $C_{10}$–$C_{12}$naphthylalkyl or —$COR_6$, with the proviso that, if one of the radicals $R_2$, $R_3$, $R_4$ and $R_5$ is hydroxyl, the other radical attached to the same carbon atom is other than hydroxyl; or else $R_2$ and $R_3$ or $R_4$ and $R_5$, together with the carbon atom to which they are attached, form a $C_5$–$C_{10}$cycloalkylidene ring, $R_6$ is hydroxyl, $C_1$–$C_{12}$alkoxy, $C_2$–$C_{12}$alkoxy which is interrupted by oxygen or sulfur; or is

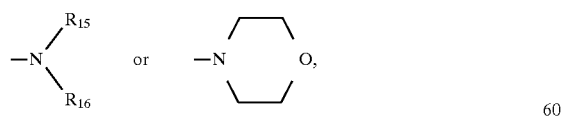

$R_7$, $R_8$, $R_9$, $R_{10}$ and $R_{11}$ independently of one another are hydrogen, hydroxyl, halogen, nitro, cyano, $CF_3$, —$COR_6$, $C_1$–$C_{18}$alkyl, $C_2$–$C_{18}$alkyl which is interrupted by oxygen or sulfur; $C_1$–$C_{18}$haloalkyl, $C_1$–$C_{12}$alkoxy, $C_2$–$C_{12}$alkoxy which is interrupted by oxygen or sulfur; $C_1$–$C_{12}$alkylthio, $C_2$–$C_{18}$alkenyl, $C_5$–$C_{12}$cycloalkyl, $C_5$–$C_{12}$cycloalkenyl, phenyl, naphthyl, $C_7$–$C_9$phenylalkyl, $C_{10}$–$C_{12}$naphthylalkyl, phenoxy, naphthoxy, $C_7$–$C_9$phenylalkoxy or $C_{10}$–$C_{12}$naphthylalkoxy; or else the radicals $R_8$ and $R_9$ or the radicals $R_9$ and $R_{10}$ or the radicals $R_{10}$ and $R_{11}$ or the radicals $R_7$ and $R_{11}$, together with the carbon atoms to which they are attached, form a benzo ring, with the proviso that at least one of the radicals $R_7$, $R_8$, $R_9$, $R_{10}$ and $R_{11}$ is hydrogen, $R_{12}$ is hydroxyl, chlorine, nitro, cyano, $CF_3$, $C_1$–$C_{18}$alkyl, $C_2$–$C_{18}$alkyl which is interrupted by oxygen or sulfur; $C_1$–$C_{18}$haloalkyl, $C_1$–$C_{12}$alkoxy, $C_2$–$C_{12}$alkoxy which is interrupted by oxygen or sulfur; $C_1$–$C_{12}$alkylthio or $C_2$–$C_{18}$alkenyl, $R_{13}$ and $R_{14}$ inependently of one another are hydrogen $C_1$–$C_{18}$alkyl, $C_1$–$C_{12}$alkoxy or —Y—$(CH_2)COR_6$, $R_{15}$ and $R_{16}$ independently of one another are hydrogen, $C_1$–$C_{18}$alkyl, $C_3$–$C_{18}$alkyl which is interrupted by oxygen or sulfur; $C_2$–$C_{28}$alkenyl, $C_5$–$C_{12}$cycloalkyl, phenyl or naphthyl, $R_{17}$ and $R_{18}$ independently of one another are hydrogen, $C_1$–$C_{18}$alkyl, $C_3$–$C_{18}$alkyl which is interrupted by oxygen or sulfur; or is $C_2$–$C_{18}$alkenyl, $R_{19}$ is $C_1$–$C_{18}$alkyl, $C_2$–$C_{18}$alkyl which is interrupted by oxygen or sulfur, hydroxyl, $C_1$–$C_{12}$alkoxy or $C_2$–$C_{18}$alkenyl, $R_{20}$ is hydroxyl, $C_1$–$C_{12}$alkoxy or $C_2$–$C_{12}$alkoxy which is interrupted by oxygen or sulfur; and, if a and b together are 1, three radicals $R_{20}$ together are $N(CH_2CH_2O—)_3$, $R_{21}$ is hydrogen or $C_1$–$C_6$alkyl, $X_1$ is a direct bond, oxygen, sulfur,

$C_1$–$C_{12}$alkylene, $C_2$–$C_{12}$akylene which is interrupted by oxygen or sulfur; $C_2$–$C_{12}$akenylene, $C_2$–$C_{12}$alkynylene, $C_2$–$C_{16}$alkylidene, $C_7$–$C_{16}$phenylalkylidene or $C_5$–$C_8$cycloalkylene, with the proviso that, if m and n are 0, $X_1$ is other than oxygen and sulfur, $X_2$ is $C_2$–$C_{12}$alkylene, $C_2$–$C_{16}$alkylidene, $C_7$–$C_{16}$phenylalkylidene, $C_5$–$C_8$cycloalkylene, phenylene, naphthylene, or $C_4$–$C_{12}$alkylene which is interrupted by oxygen, sulfur or

with the proviso that two nitrogen atoms are not attached to the same carbon atom, Y is oxygen or

$R_a$ is hydrogen or $C_1$–$C_6$alkyl, m and n independently of one another are integers from 0 to 8, p is an integer from 0 to 2, and s is an integer from 1 to 6.

Coating compositions which are of interest are those comprising as component (b) a salt and/or an amide derived from i) a polyacrylic acid, an acrylic acid-maleic acid copolymer or a carboxylic acid of the formula I and ii) an aminosilane of the formula V in which $R_1$ is $C_1$–$C_{25}$alkyl, $C_2$–$C_{12}$alkyl which is interrupted by oxygen; $C_2$–$C_{18}$alkenyl, $C_5$–$C_{12}$cycloalkyl, $C_5$–$C_{12}$cycloalkenyl which is unsubstituted or substituted by $C_1$–$C_4$alkyl and/or carboxyl; $C_7$–$C_9$phenylalkyl, —$COR_6$ or a radical of the formula II or III

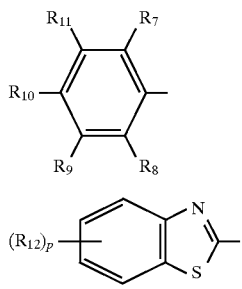

$R_2$, $R_3$, $R_4$ and $R_5$ independently of one another are hydrogen, $C_1$–$C_8$alkoxy, $C_1$–$C_{18}$alkyl, $C_2$–$C_{12}$alkyl which is interrupted by oxygen; $C_2$–$C_{12}$alkenyl, $C_5$–$C_8$cycloalkyl, $C_5$–$C_8$cycloalkenyl, phenyl naphthyl, benzyl or —$COR_6$, or else $R_2$ and $R_3$ or $R_4$ and $R_5$, together with the carbon atom to which they are attached, form a $C_5$–$C_7$cycloalkylidene ring, $R_6$ is hydroxyl, $C_1$–$C_{12}$alkoxy, $C_2$–$C_{12}$alkoxy which is interrupted by oxygen or sulfur; or is

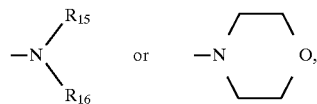

$R_7$, $R_8$, $R_9$, $R_{10}$ and $R_{11}$ independently of one another are hydrogen, hydroxyl, chlorine, nitro, —$COR_6$, $C_1$–$C_{12}$alkyl, $C_2$–$C_{12}$alkyl which is interrupted by oxygen; $C_1$–$C_8$alkoxy, $C_1$–$C_8$alkylthio, $C_2$–$C_{12}$alkenyl, $C_5$–$C_{18}$cycloalkyl, $C_5$–$C_8$cycloalkenyl phenyl, naphthyl, benzyl phenoxy, naphthoxy or benzyloxy; or else the radicals $R_9$ and $R_{19}$ or the radicals $R_{10}$ and $R_{11}$ together with the carbon atoms to which they are attached, form a benzo ring, with the proviso that at least one of the radicals $R_7$, $R_8$, $R_9$, $R_{10}$ and $R_{11}$ is hydrogen, $R_{12}$ is hydroxyl, chlorine, $C_1$–$C_{12}$alkyl, $C_1$–$C_{12}$alkoxy, $C_2$–$C_{12}$alkoxy which is interrupted by oxygen, $R_{15}$ and $R_{16}$ independently of one another are hydrogen, $C_1$–$C_{12}$alkyl, $C_2$–$C_{12}$alkenyl, $C_5$–$C_7$cycloalkyl, phenyl or naphthyl, $X_1$ is a direct bond, sulfur,

$C_1$–$C_{12}$alkylene, $C_2$–$C_{12}$alkylene which is interrupted by oxygen; $C_2$–$C_{12}$alkenylene or $C_5$–$C_8$cycloalkylene, with the proviso that, if m and n are 0, $X_1$ is other than sulfur, m and n independently of one another are integers from 0 to 8, and p is an integer from 0 to 2.

Preferred coating compositions are those comprising as component (b) a salt and/or an amide derived from i) a polyacrylic acid, an acrylic acid-maleic acid copolymer or a carboxylic acid of the formula I and ii) an aminosilane of the formula V in which $R_1$ is $C_1$–$C_{25}$alkyl, $C_2$–$C_{18}$alkenyl, $C_5$–$C_8$cycloalkyl, $C_5$–$C_8$cycloalkenyl which is unsubstituted or substituted by $C_1$–$C_4$alkyl and/or carboxyl; benzyl, —$COR_6$ or a radical of the formula II or III

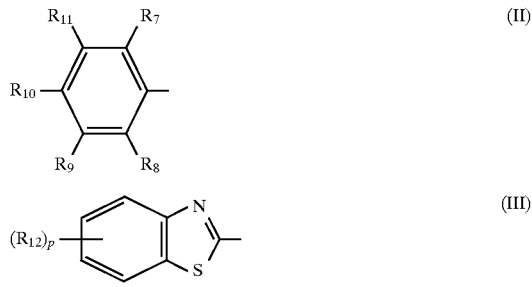

$R_2$, $R_3$, $R_4$ and $R_5$ independently of one another are hydrogen, $C_1$–$C_{12}$alkyl, $C_2$–$C_{12}$alkenyl, cyclohexyl, phenyl, naphthyl, benzyl or —$COR_6$, $R_6$ is hydroxyl, $C_1$–$C_8$alkoxy or

$R_7$ is hydrogen, chlorine or $C_1$–$C_4$alkyl,
$R_8$ is hydrogen, hydroxyl, $C_1$–$C_4$alkyl, nitro or chlorine,
$R_9$ is hydrogen or $C_1$–$C_4$alkyl,
$R_{10}$ is hydrogen, $C_1$–$C_4$alkyl, nitro, chlorine or —$COR_6$,
$R_{11}$ is hydrogen or $C_1$–$C_4$alkyl,
$R_{12}$ is chlorine, $C_1$–$C_8$alkyl or $C_1$–$C_8$alkoxy,
$R_{15}$ and $R_{16}$ independently of one another are hydrogen or $C_1$–$C_4$alkyl,
$X_1$ is a direct bond, sulfur

or $C_1$–$C_{10}$alkylene, with the proviso that, if m and n are 0, $X_1$ is other than sulfur, m and n independently of one another are integers from 0 to 4, and p is 1.

Other preferred coating compositions are those comprising as component (b) a salt and/or an amide derived from i) a polyacrylic acid, an acrylic acid-maleic acid copolymer or a carboxylic acid of the formula I and ii) an aminosilane of the formula V in which $R_{17}$ and $R_18$ independently of one another are hydrogen, $C_1$–$C_{12}$alkyl, $C_3$–$C_{12}$alkyl which is interrupted by oxygen; or $C_2$–$C_{12}$alkenyl, $R_{19}$ is $C_1$–$C_{12}$alkyl, $C_3$–$C_{12}$alkyl which is interrupted by oxygen; hydroxyl, $C_1$–$C_{10}$alkoxy or $C_2$–$C_{12}$alkenyl, $R_{20}$ is hydroxyl, $C_1$–$C_{10}$alkoxy or $C_2$–$C_{10}$alkoxy which is interrupted by oxygen; and, if a and b together are 1, three radicals $R_{20}$ together are $N(CH_2CH_2O—)_3$, $R_{21}$ is hydrogen or $C_1$–$C_4$alkyl, $X_2$ is $C_2$–$C_{10}$alkylene, $C_2$–$C_{12}$alkylidene, $C_5$–$C_8$cycloalkylene, phenylene, or $C_4$–$C_{12}$alkylene which is interrupted by

with the proviso that two nitrogen atoms are not attached to the same carbon atom.

Also of interest are coating compositions comprising as component (b) a salt and/or an amide derived from i) a polyacrylic acid, an acrylic acid-maleic acid copolymer or a carboxylic acid of the formula I and ii) an aminosilane of the formula V in which $R_{17}$ and $R_{18}$ independently of one another are hydrogen or $C_1$–$C_8$allyl, $R_{19}$ is $C_1$–$C_8$alkyl, hydroxyl, $C_1$–$C_8$alkoxy or $C_2$–$C_8$alkenyl, $R_{20}$ is hydroxyl or $C_1$–$C_8$alkoxy; and, if a and b together are 1, three radicals $R_{20}$ together are $N(CH_2CH_2O-)_3$, $R_{21}$ is hydrogen or $C_1$–$C_4$alkyl, $X_2$ is $C_2$–$C_6$alkylene, $C_5$–$C_8$cycloalkylene, phenylene, or $C_4$–$C_8$alylene which is interrupted by

with the proviso that two nitrogen atoms are not attached to the same carbon atom, a is 1, and b is 0 or 1.

Coating compositions of special interest are those comprising as component (b) a salt and/or an amide derived from i) a polyacrylic acid, an acrylic acid-maleic acid copolymer or a carboxylic acid of the formula I and ii) an aminosilane of the formula V in which $R_1$ is $C_1$–$C_{25}$alkyl, $C_2$–$C_{16}$alkenyl, 2-carboxy-4-methylcyclohexenyl, cyclohexyl, benzyl, —$COR_6$ or a radical of the formula II or III

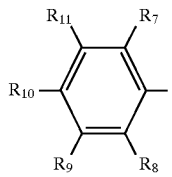

$R_2$, $R_3$, $R_4$ and $R_5$ independently of one another are hydrogen, $C_1$–$C_8$alkyl, phenyl, benzyl or —$COR_6$, $R_6$ is hydroxyl, $C_1$–$C_4$alkoxy or

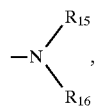

$R_7$ is hydrogen or $C_1$–$C_4$alkyl, $R_8$ is hydrogen, hydroxyl, $C_1$–$C_4$alkyl, nitro or chlorine, $R_9$ is hydrogen or $C_1$–$C_4$alkyl, $R_{10}$ is hydrogen, $C_1$–$C_4$alkyl, nitro, chlorine or —$COR_6$, $R_{11}$ is hydrogen or $C_1$–$C_4$alkyl, $R_{12}$ is chlorine, $C_1$–$C_4$alkyl or $C_1$–$C_4$alkoxy, $R_{15}$ and $R_{16}$ independently of one another are hydrogen or $C_1$–$C_4$alkyl, $R_{17}$ and $R_{18}$ independently of one another are hydrogen or $C_1$–$C_4$alkyl, $R_{19}$ is $C_1$–$C_6$alkyl, $C_2$–$C_6$alkenyl, hydroxyl or $C_1$–$C_4$alkoxy, $R_{20}$ is hydroxyl or $C_1$–$C_4$alkoxy, and, if a and b together are 1, three radicals $R_{20}$ together are $N(CH_2CH_2O-)_3$, $R_{21}$ is hydrogen or $C_1$–$C_4$alkyl, $X_1$ is a direct bond, sulfur

or $C_1$–$C_{10}$alkylene, with the proviso that, if m and n are 0, $X_1$ is other than sulfur, $X_2$ is $C_2$–$C_6$alkylene, cyclohexylene, or $C_4$–$C_8$alkylene which is interrupted by

with the proviso that never two nitrogen atoms are attached to the same carbon atom, a is 1, b is 0 or 1, m and n independently of one another are 0, 1 or 2, and p is 0 or 1.

Coating compositions which are especially of particular interest are those comprising as component (b) a salt and/or an amide derived from i) a polyacrylic acid, an acrylic acid-maleic acid copolymer or a carboxylic acid of the formula I and ii) an aminosilane of the formula V in which $R_1$ is $C_1$–$C_{18}$alkyl, 2-carboxy-4methylcyclohexenyl, —$COR_6$ or a radical of the formula II or III

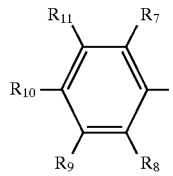

$R_2$ is hydrogen, $R_3$ is hydrogen or —$COR_6$, $R_4$ and $R_5$ are hydrogen, $R_6$ is hydroxyl, $R_7$ is hydrogen, $R_8$ is hydrogen, hydroxyl, $C_1$–$C_4$alkyl, nitro or chlorine, $R_9$ is hydrogen, $R_{10}$ is hydrogen, $C_1$–$C_4$alkyl or nitro, $R_{11}$ is hydrogen, $R_{17}$ and $R_{18}$ are hydrogen or methyl, $R_{19}$ is $C_1$–$C_4$alkyl, hydroxyl or $C_1$–$C_4$alkoxy, $R_{20}$ is hydroxyl or $C_1$–$C_4$alkoxy, and, if a and b together are 1, three radicals $R_{20}$ together are $N(CH_2CH_2O—)_3$, $R_{21}$ is hydrogen, $X_1$ is a direct bond, sulfur

or $C_1$–$C_8$alkylene with the proviso that, if m and n are 0, $X_1$ is other than sulfur, $X_2$ is $C_2$–$C_4$alkylene, or $C_4$–$C_6$alkylene which is interrupted by

with the proviso that two nitrogen atoms are not attached to the same carbon atom, a is 1, b is 0 or 1, m and n independently of one another are 0 or 1, and p is 0.

Coatings of very particular interest are those in which component (D) is derived from an aminosilane of the formula V in which at least one of the radicals $R_{17}$ and $R_{18}$ is hydrogen.

Special preference is given to coating compositions comprising as component (b) a salt and/or an amide derived from i) a polyacrylic acid, an acrylic acid-maleic acid copolymer or a carboxylic acid of the formula I, wherein the carboxylic acid of the formula I is acetic acid, heptanoic acid, o-toluic acid (2-methylbenzoic acid), 2-ethylhexanoic acid, stearic acid, lauric acid, oleic acid, linoleic acid, acetylenecarboxylic acid, cyclohexanecarboxylic acid, naphthenic acid, benzoic acid, o-nitrobenzoic acid, p-nitrobenzoic acid, o-chlorobenzoic acid, 4-methyl-4cyclohexene-1,2-dicarboxylic acid, 2-dodecenylsuccinic acid, phthalic acid, naphthoic acid, phenylacetic acid, cinnamic acid, sebacic acid, succinic acid 3-(4-methylbenzoyl) propionic acid, maleic acid, acetylenedicarboxylic acid, cyclohexanedicarboxylic acid, trimellitic acid, hydroxybutyric acid, mandelic acid, salicylic acid, hydroxynaphthoic acid, hydroxysuccinic acid, anthranilic acid, 2-mercaptobenzothiazolylsuccinic acid [®Igacor 252 (Ciba-Geigy)], 6-[4,6-bis(5-carboxypentylamino)-[1,3,5]-triazin-2-ylamino]-hexanecarboxylic acid [®Reocor 190 (Ciba-Geigy)], furancarboxylic acid, pyrrolecarboxylic acid or pyrazoledicarboxylic acid; and ii) an aminosilane of the formula V, wherein the aminosilane of the formula V is 3-aminopropyltriethoxysilane, 3-aminopropyltrimethoxysilane, N-methyl-3-aminopropyltrimethoxysilane, 3-aminopropylmethyldiethoxysilane, 3-aminopropyldimethylethoxysilane, N-allyl-3-aminopropyltrimethoxysilane, 4aminobutyltriethoxysilane, N,N'-dimethyl-3-aminopropyltriethoxysilane, N,N'-dibutyl-3-aminopropyltriethoxysilane, N,N'-(di-2-hydroxyethyl)-3-aminopropyltriethoxysilane, bis[3-(triethoxysilyl)propyl]amine, 3-(2-aminoethylamino) propyltrimethoxysilane, 3-(2-aminoethylamino) propylmethyldimethoxysilane, 3-(6-aminohexylamino) propyltrimethoxysilane, 3-[2-(2-aminoethylamino) ethylamino]propyltrimethoxysilane, aminophenyltrimethoxysilane or 3-aminopropylsilatrane.

Very special preference is given to coating compositions comprising as component (b) a salt and/or an amide derived from lauric acid with an aminosilane of the formula V, especially 3-aminopropyltriethoxysilane, 3-aminopropyltrimethoxysilane, 3-aminopropyldiethoxyhydroxysilane, 3-aminopropyldihydroxyethoxysilane, 3-aminopropyltrihydroxysilane, 3-aminopropyldimethoxyhydroxysilane, 3-aminopropyldihydroxymethoxysilane, 3-aminopropylsilatrane, 3-aminopropylmethyldiethoxysilane or 3-(2-aminoethylamino)propyltrimethoxysilane.

Aminosilanes of the formula V in which $R_{19}$ and/or $R_{20}$ are hydroxyl can readily undergo oligomerisation or polymerisation with elmination of water. The present invention therefore also provides coating compositions comprising as component (b) a salt and/or an amide derived from i) a polyacrylic acid, an acrylic acid/maleic acid copolymer or a carboxylic acid of formula I and ii) an aminosilane of the formula V which, if at least one of the radicals $R_{19}$ and $R_{20}$ is hydroxyl, can have an oligomeric or polymeric structure.

The salts and amides derived from i) a polyacrylic acid, an acrylic acid-maleic acid copolymer or a carboxylic acid of the formula I and ii) an aminosilane of the formula V are suitable as corrosion inhibitors and adhesion promoters in coating compositions for protecting metallic surfaces, but also for pretreating metallic substrates. As such they can be added to all liquid or solid organic materials.

The salts are advantageously prepared in situ in the course of the preparation of the coating composition. There is therefore also interest in coating compositions in which component (a) is formed in situ during the preparation of the coating composition by separate addition of components (i) and (ii) and subsequent mixing of the coating composition.

The present invention also provides a process for the preparation of a coating composition comprising a salt derived from i) a polyacrylic acid, an acrylic acid-maleic acid copolymer or a carboxylic acid of the formula I and ii) an aminosilane of the formula V, which comprises mixing an organic film-forming binder with at least one polyacrylic acid, an acrylic acid-maleic acid copolymer or a carboxylic acid of the formula I and at least one aminosilane of the formula V.

The coating composition is preferably a surface-coating material. It is especially preferably an aqueous surface-coating material.

Examples of surface-coating materials are paints, inks or varnishes. These always comprise an organic film-forming binder in addition to other, optional components.

Preferred organic film-forming binders are epoxy resins, polyurethane resins, polyester resins, acrylic resins and copolymer resins thereof, polyvinyl resins, phenolic resins, alkyd resins or mixtures of such resins.

Suitable organic film-forming binders of the coating composition are all customary film formers for solvent-free or solvent-containing, but especially for aqueous, coating compositions. Examples of such film formers are epoxy resins, polyurethane resins, amino resins or mixtures of such resins; a basic aqueous dispersion or a solution of an acidic resin.

Particular interest attaches to organic fi-forming binders for aqueous coating compositions, for example alkyd resins; acrylic resins; 2-component epoxy resins; polyurethane resins; polyester resins, which are usually saturated; water-dilutable phenolic resins or derived dispersions; water-dilutable urea resins; resins based on vinyl-acrylic copolymers; hybrid systems based on epoxy acrylates, for example.

More specifically, the alkyd resins can be water-dilutable alkyd resin systems which can be employed in air-drying form or in the form of stoving systems, optionally in combination with water-dilutable melamine resins; they may also be oxidatively drying, air-drying or stoving systems which can be employed optionally in combination with aqueous dispersions based on acrylic resins or their copolymers, with vinyl acetates, etc.

The acrylic resins can be pure acrylic resins, epoxy acrylate hybrid systems, acrylic acid or acrylic ester copolymers, combinations with vinyl resins or copolymers of vinyl monomers such as vinyl acetate, stryrene or butadiene. These systems can be air-drying or stoving systems.

In combination with appropriate polyamine crosslinking agents, water-dilutable epoxy resins exhibit excellent mechanical and chemical resistance. When liquid epoxy resins are used, the addition of organic solvents to aqueous systems is unnecessary. The use of solid resins or solid-resin dispersions normally requires the addition of small amounts of solvent in order to improve film formation.

Preferred epoxy resins are those based on aromatic polyols, especially those based on bisphenols. The epoxy resins are employed in combination with crosslinking agents. The latter may in particular be amino- or hydroxy-functional compounds, an acid, an acid anhydride or a Lewis acid. Examples thereof are polyamines, polyaminoamides, polymers based on polysulfides, polyphenols, boron fluorides and their complex compounds, polycarboxylic acids, 1,2-dicarboxylic anhydrides, or pyromellitic anhydride.

Polyurethane resins are derived from polyethers, polyesters and polybutadienes with terminal hydroxyl groups, on the one hand, and from aliphatic or aromatic polyisocyanates on the other hand.

Examples of suitable polyvinyl resins are polyvinylbutyral, polyvinyl acetate or copolymers thereof.

Suitable phenolic resins are synthetic resins in whose synthesis phenols are the principal component, i.e. in particular phenol-, cresol-, xylenol- and resorcinol-formaldehyde resins, alkylphenolic resins, and condensation products of phenols with acetaldehyde, furfurol, acrolein or other aldehydes. Modified phenolic resins are also of interest.

The coating compositions can additionally comprise one or more components from the group consisting of pigments, dyes, fillers, flow control agents, dispersants, thixotropic agents, adhesion promoters, antioxidants, light stabilizers and curing catalysts. They can also contain other known anticorrosion agents, for example anticorrosion pigments, such as phosphate- or borate-containing pigments or metal oxide pigments, or other organic or inorganic corrosion inhibitors, for example salts of nitroisophthalic acid, phosphoric esters, industrial amines or substituted benzotriazoles.

The pigments are, for example, titanium dioxide, iron oxide, aluminium bronze or phthalocyanine blue.

Examples of fillers are talc, alumina, aluminium silicate, barytes, mica or silica The corrosion inhibitors can also be applied to a carrier material. Materials suitable for this purpose are, in particular, pulverulent fillers or pigments.

Flow control agents and thixotropic agents are based, for example, on modified bentonites.

Adhesion promoters are based, for example, on modified silanes.

It is also advantageous to add basic fillers or pigments, which in certain binder systems bring about a synergistic effect on the inhibition of corrosion. Examples of such basic fillers and pigments are calcium carbonate or magnesium carbonate, zinc oxide, zinc carbonate, zinc phosphate, magnesium oxide, alumina, aluminium phosphate or mixtures thereof. Examples of basic organic pigments are those based on aminoanthraquinone.

The corrosion inhibitors can be added to the surface-coating material during its production, for example during the dispersion of the pigment by milling, or else the inhibitor is dissolved in a solvent and then stirred into the coating composition. The solutions of the corrosion inhibitors can also be used to pretreat the metal surface.

In the preparation of the organic film-forming binder by addition polymerisation or polycondensation of monomers, the corrosion inhibitors can be mixed in with the monomers prior to polymerisation, either in solid form or in solution.

The salts and/or amides, or components (i) and (ii), are advantageously used in a quantity of from 0.01 to 20% by weight, preferably from 0.05 to 5% by weight and, in particular, from 0.1 to 5% by weight, based on the overall solids content of the coating composition. The surface-coating materials can be applied to the substrate by the customary methods, for example by spraying, dipping, brushing or by electrodeposition. Frequently, two or more coats are applied. The corrosion inhibitors are primarily added to the basecoat (primer), since they act in particular at the metal/coating interface. However, they can also be added to the intermediate coat or topcoat as well. Depending on whether the binder is a physically, chemically or oxidatively drying resin or a heat- or radiation-curing resin, the coating is cured at room temperature or by heating (stoving) or by irradiation.

The surface-coating material is preferably a primer for metallic substrates, for example iron, steel, copper, zinc or aluminium, and their alloys.

In addition to their anticorrosive action, the salts and/or amides derived from i) a apolyacrylic acid, an acrylic acid-maleic acid copolymer or a carboxylic acid of the formula I and ii) an aminosilane of the formula V have the advantage that they favourably influence the adhesion between coating and metal, exhibit no adverse effects on the storage stability of the novel coating compositions, and are readily compatible with the binder.

A preferred embodiment of the present invention is therefore the use of the salts and amides derived from i) a polyacrylic acid, an acrylic acid-maleic acid copolymer or a carboxylic acid of the formula I and ii) an aminosilane of the formula V as corrosion inhibitors in coating compositions for metallic surfaces.

The present invention also provides a method of protecting a corrodable metal substrate, which comprises applying to this substrate a coating composition comprising a) an organic film-forming binder and b) as corrosion inhibitor at least one salt ($\alpha$) and/or at least one amide ($\beta$), both components ($\alpha$) and ($\beta$) derived from i) a polyaciylic acid, an acrylic acid-maleic acid copolymer or a carboxylic acid of the formula I and ii) an aminosilane of the formula V, and then drying and/or curing the coating composition.

The invention likewise provides novel salts derived from
i) a polyacrylic acid, an acrylic acid-maleic acid copolymer
or a carboxylic acid of the formula I

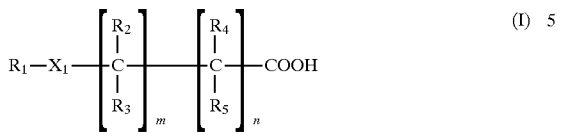

in which $R_1$ is hydrogen, $C_1$–$C_{25}$alkyl, $C_2$–$C_{25}$alkyl which is interrupted by oxygen or sulfur; $C_2$–$C_{24}$alkenyl, $C_4$–$C_{15}$cycloalkyl which is unsubstituted or substituted by $C_1$–$C_4$alkyl and/or carboxyl; $C_5$–$C_{15}$cycloalkenyl which is unsubstituted or substituted by $C_1$–$C_4$alkyl and/or carboxyl; $C_{13}$–$C_{26}$polycycloalkyl, $C_7$–$C_9$phenylalkyl which is unsubstituted or substituted on the phenyl ring by $C_1$–$C_4$alkyl; —$COR_6$, a 5- or 6-membered heterocyclic ring which is unsubstituted or substituted by $C_1$–$C_4$alkyl, $C_1$–$C_4$alkoxy, halogen or carboxyl; a 5- or 6-membered heterocyclic ring which is benzo-fused and is unsubstituted or substituted by $C_1$–$C_4$alkyl, $C_1$–$C_4$alkoxy, halogen or carboxyl; or else $R_1$ is a radical of the formula II, III or IV

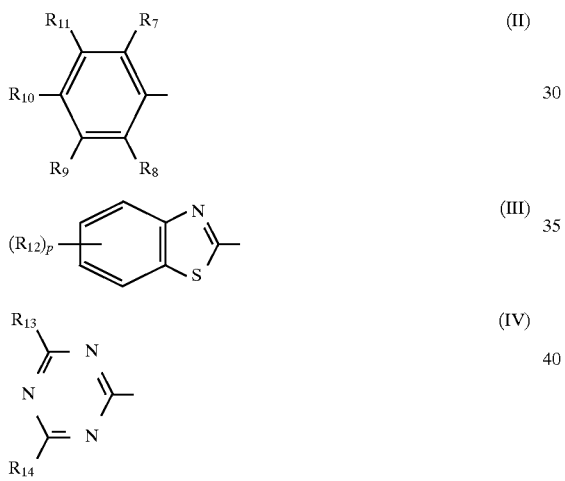

$R_2$, $R_3$, $R_4$ and $R_5$ independently of one another are hydrogen, hydroxyl, $C_1$–$C_{18}$alkoxy, $C_2$–$C_{18}$alkoxy which is interrupted by oxygen or sulfur; $C_1$–$C_{25}$alkyl, $C_2$–$C_{25}$alkyl which is interrupted by oxygen or sulfur; $C_2$–$C_{24}$alkenyl, $C_5$–$C_{15}$cycloalkyl which is unsubstituted or substituted by $C_1$–$C_4$alkyl; $C_5$–$C_{15}$cycloalkenyl which is unsubstituted or substituted by $C_1$–$C_4$alkyl; phenyl or naphthyl which is unsubstituted or substituted by $C_1$–$C_4$alkyl; $C_7$–$C_9$phenylalkyl which is unsubstituted or substituted on the phenyl ring by $C_1$–$C_4$alkyl; $C_{10}$–$C_{12}$naphthylalkyl which is unsubstituted or substituted on the naphthyl ring system by $C_1$–$C_4$alkyl; or are —$COR_6$, with the proviso that, if one of the radicals $R_2$, $R_3$, $R_4$ and $R_5$ is hydroxyl, the other radical attached to the same carbon atom is other than hydroxyl; or else $R_2$ and $R_3$ or $R_4$ and $R_5$, together with the carbon atom to which they are attached, form an unsubstituted or $C_1$–$C_4$alkyl-substituted $C_5$–$C_{12}$cycloalkylidene ring, $R_6$ is hydroxyl, $C_1$–$C_{18}$alkoxy, $C_2$–$C_{18}$alkoxy which is interrupted by oxygen or sulfur; or is

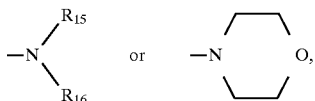

$R_7$, $R_8$, $R_9$, $R_{10}$ and $R_{11}$ independently of one another are hydrogen, hydroxyl, halogen, nitro, cyano, $CF_3$, —$COR_6$, $C_1$–$C_{25}$alkyl, $C_2$–$C_{25}$alkyl which is interrupted by oxygen or sulfur; $C_1$–$C_{25}$haloalkyl, $C_1$–$C_{18}$alkoxy, $C_2$–$C_{18}$alkoxy which is interrupted by oxygen or sulfur; $C_1$–$C_{18}$alkylthio, $C_2$–$C_{24}$alkenyl, $C_5$–$C_{15}$cycloalkyl which is unsubstituted or substituted by $C_1$–$C_4$alkyl; $C_5$–$C_{15}$cycloalkenyl which is unsubstituted or substituted by $C_1$–$C_4$alkyl; phenyl or naphthyl which is unsubstituted or substituted by $C_1$–$C_4$alkyl; $C_7$–$C_9$phenylalkyl which is unsubstituted or substituted on the phenyl ring by $C_1$–$C_4$alkyl; $C_{10}$–$C_{12}$naphthylalkyl which is unsubstituted or substituted on the naphthyl ring system by $C_1$–$C_4$alkyl; phenoxy or naphthoxy which is unsubstituted or substituted by $C_1$–$C_4$alkyl; $C_7$–$C_9$phenylalkoxy which is unsubstituted or substituted on the phenyl ring by $C_1$–$C_4$alkyl; $C_{10}$–$C_{12}$naphthylalkoxy which is unsubstituted or substituted on the naphthyl ring system by $C_1$–$C_4$alkyl; or else the radicals $R_8$ and $R_9$ or the radicals $R_9$ and $R_{10}$ or the radicals $R_{10}$ and $R_{11}$ or the radicals $R_7$ and $R_{11}$, together the carbon atoms to which they are attached, form an unsubstituted or $C_1$–$C_4$alkyl-, halogen- or $C_1$–$C_4$alkoxy-substituted benzo ring, with the proviso that at least one of the radicals $R_7$, $R_8$, $R_9$, $R_{10}$ and $R_{11}$ is hydrogen, $R_{12}$ is hydroxyl, halogen, nitro, cyano, $CF_3$, $C_1$–$C_{25}$alkyl, $C_2$–$C_{25}$alkyl which is interrupted by oxygen or sulfur, $C_1$–$C_{25}$haloalkyl, $C_1$–$C_{18}$alkoxy, $C_2$–$C_{18}$alkoxy which is interrupted by oxgyen or sulfur; $C_1$–$C_{18}$alkylthio or $C_2$–$C_{24}$alkenyl, $R_{13}$ and $R_{14}$ independently of one another are hydrogen, $C_1$–$C_{25}$alkyl, $C_1$–$C_{18}$alkoxy or —Y—$(CH_2)_s COR_6$, $R_{15}$ and $R_{16}$ independently of one another are hydrogen, $C_1$–$C_{25}$alkyl, $C_3$–$C_{25}$alkyl which is interrupted by oxygen or sulfur; $C_2$–$C_{24}$alkenyl, $C_5$–$C_{15}$cycloalkyl which is unsubstituted or substituted by $C_1$–$C_4$alkyl; phenyl or naphthyl which is unsubstituted or substituted by $C_1$–$C_4$alkyl, $X_1$ is a direct bond, oxygen, sulfur

$C_1$–$C_{18}$alkylene, $C_2$–$C_{18}$alkylene which is interrupted by oxygen or sulfur; $C_2$–$C_{18}$alkenylene, $C_2$–$C_{18}$alkynylene, $C_2$–$C_{20}$alkylidene, $C_7$–$C_{20}$phenylalkylidene or $C_5$–$C_8$cycloalkylene, with the proviso that, if m and n are 0, $X_1$ is other than oxygen and sulfur, Y is oxygen or

$R_a$ is hydrogen or $C_1$–$C_8$alkyl, m and n independently of one another are integers from 0 to 10, p is an integer from 0 to 4, s is an integer from 1 to 8, and ii) an aminosilane of the formula V

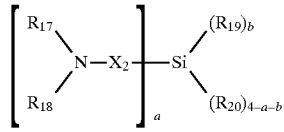
(V)

in which

R$_{17}$ and R$_{18}$ independently of one another are hydrogen, C$_1$–C$_{25}$alkyl, 2-hydroxyethyl, C$_3$–C$_{25}$alkyl which is interrupted by oxygen or sulfur; C$_2$–C$_{24}$alkenyl or

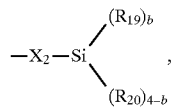

R$_{19}$ is C$_1$–C$_{25}$alkyl, C$_2$–C$_{25}$alkyl which is interrupted by oxygen or sulfur; hydroxyl, C$_1$–C$_{18}$alkoxy or C$_2$–C$_{24}$alkenyl, R$_{20}$ is hydroxyl, C$_1$–C$_{18}$alkoxy or C$_2$–C$_{18}$alkoxy which is interrupted by oxygen or sulfur; and, if a and b together are 1, three radicals R$_{20}$ together are N(CH$_2$CH$_2$O—)$_3$, R$_{21}$ is hydrogen or C$_1$–C$_8$alkyl, X$_2$ is C$_1$–C$_{18}$alkylene, C$_2$–C$_{20}$alkylidene, C$_7$–C$_{20}$phenylalkylidene, C$_5$–C$_8$cycloalkylene, phenylene or naphthylene which is unsubstituted or substituted by C$_1$–C$_4$alkyl; or is C$_4$–C$_{18}$alkylene which is interrupted by oxygen, sulfur or

with the proviso that two nitrogen atoms are not attached to the same carbon atom, a is 1 or 2, and b is 0, 1 or 2.

Preferred groups of novel salts derived from i) a polyacrylic acid, an acrylic acid-maleic acid copolymer or a carboxylic acid of the formula I and an aminosilane of the formula V correspond to the preferences expressed above for the coating compositions.

Preference is additionally given to salts derived from i) a carboxylic acid of the formula I in which R$_1$ is hydrogen, C$_1$–C$_{25}$alkyl, C$_2$–C$_{25}$alkyl interrupted by oxygen or sulfur; C$_2$–C$_{24}$alkenyl, C$_4$–C$_{15}$cycloalkyl which is unsubstituted or substituted by C$_1$–C$_4$alkyl; C$_5$–C$_{15}$cycloalkenyl which is-unsubstituted or substituted by C$_1$–C$_4$allyl; C$_{13}$–C$_{26}$polycycloalkyl, C$_7$–C$_9$phenylalkyl which is unsubstituted or substituted on the phenyl ring by C$_1$–C$_4$alkyl; —COR$_6$, a 5- or 6-membered heterocyclic ring which is unsubstituted or substituted by C$_1$–C$_4$alkyl, C$_1$–C$_4$alkoxy, halogen or carboxyl; a 5- or 6-membered heterocyclic ring which is benzo-fased and is unsubstituted or substituted by C$_1$–C$_4$alkyl, C$_1$–C$_4$alkoxy, halogen or carboxyl; or else R$_1$ is a radical of the formula II, III or IV

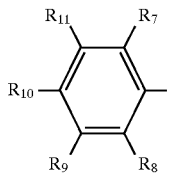
(II)

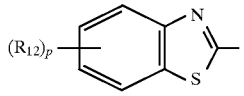
(III)

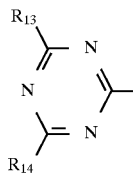
(IV)

R$_2$, R$_3$, R$_4$ and R$_5$ independently of one another are hydrogen, hydroxyl, C$_1$–C$_{18}$alkoxy, C$_2$–C$_{18}$alkoxy which is interrupted by oxygen or sulfur; C$_1$–C$_{25}$alkyl, C$_2$–C$_{25}$alkyl which is interrupted by oxygen or sulfur; C$_2$–C$_{24}$alkenyl, C$_5$–C$_{15}$cycloalkyl which is unsubstituted or substituted by C$_1$–C$_4$alkyl; C$_5$–C$_{15}$cycloalkenyl which is unsubstituted or substituted by C$_1$–C$_4$alkyl; phenyl or naphthyl which is unsubstituted or substituted by C$_1$–C$_4$alkyl; C$_7$–C$_9$phenylalkyl which is unsubstituted or substituted on the phenyl ring by C$_1$–C$_4$alkyl; C$_{10}$–C$_{12}$naphthylalkyl which is unsubstituted or substituted on the naphthyl ring system by C$_1$–C$_4$alkyl; or are —COR$_6$, with the proviso that, if one of the radicals R$_2$, R$_3$, R$_4$ and R$_5$ is hydroxyl, the other radical attached to the same carbon atom is other than hydroxyl; or else R$_2$ and R$_3$ or R$_4$ and R$_5$, together with the carbon atom to which they are attached, form an unsubstituted or C$_1$–C$_4$alkyl-substituted C$_5$–C$_{12}$cycloalkylidene ring, R$_6$ is hydroxyl, C$_1$–C$_{18}$alkoxy, C$_2$–C$_{18}$alkoxy which is interrupted by oxygen or sulfur; or is

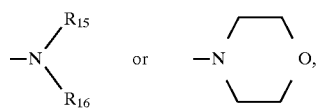

R$_7$, R$_8$, R$_9$, R$_{10}$ and R$_{11}$ independently of one another are hydrogen, hydroxyl, halogen, nitro, cyano, CF$_3$, —COR$_6$, C$_1$–C$_{25}$alkyl, C$_2$–C$_{25}$alkyl which is interrupted by oxygen or sulfur; C$_1$–C$_{25}$haloalkyl, C$_1$–C$_{18}$alkoxy, C$_2$–C$_{18}$alkoxy which is interrupted by oxygen or sulfur; C$_1$–C$_{18}$alkylthio, C$_2$–C$_{24}$alkenyl, C$_5$–C$_{15}$cycloalkyl which is unsubstituted or substituted by C$_1$–C$_4$alkyl; C$_5$–C$_{25}$cycloalkenyl which is unsubstituted or substituted by C$_1$–C$_4$alkyl; phenyl or naphthyl which is unsubstituted or substituted by C$_1$–C$_4$alkyl; C$_7$–C$_9$phenylalkyl which is unsubstituted or substituted on the phenyl ring by C$_1$–C$_4$alkyl; C$_{10}$–C$_{12}$naphthylalkyl which is unsubstituted or substituted on the naphthyl ring system by C$_1$–C$_4$alkyl; phenoxy or naphthoxy which is unsubstituted or substituted by C$_1$–C$_4$alkyl; C$_7$–C$_9$phenylalkoxy which is unsubstituted or substituted on the phenyl ring by C$_1$–C$_4$alkyl; C$_{10}$–C$_{12}$naphthylalkoxy which is unsubstituted or substituted on the naphthyl ring system by $C_1$–$C_4$alkyl; or else the radicals $R_8$ and $R_9$ or the radicals $R_9$ and $R_{10}$ or the radicals $R_{10}$ and $R_{11}$ or the radicals $R_7$ and $R_{11}$ together the carbon atoms to which they are attached, form an unsubstituted or $C_1$–$C_4$alkyl-, halogen- or $C_1$–$C_4$alkoxy-substituted benzo ring, with the proviso that at least one of the radicals $R_7$, $R_8$, $R_9$, $R_{10}$ and $R_{11}$ is hydrogen, $R_{12}$ is hydroxyl, halogen, nitro, cyano, $CF_3$, $C_1$–$C_{25}$alkyl, $C_2$–$C_{25}$alkyl which is interrupted by oxygen or sulfur; $C_1$–$C_{25}$haloalkyl, $C_1$–$C_{18}$alkoxy, $C_2$–$C_{18}$alkoxy which is interrupted by oxygen or sulfur; $C_1$–$C_{18}$alkylthio or $C_2$–$C_{24}$alkenyl, $R_{13}$ and $R_{14}$ independently of one another are hydrogen, $C_1$–$C_{25}$alkyl, $C_1$–$C_{18}$alkoxy or —O—$(CH_2)_s COR_6$, $R_{15}$ and $R_{16}$ independently of one another are hydrogen, $C_1$–$C_{25}$alkyl, $C_3$–$C_{25}$alkyl which is interrupted by oxygen or sulfur; $C_2$–$C_{24}$alkenyl, $C_5$–$C_{15}$cycloalkyl which is unsubstituted or substituted by $C_1$–$C_4$alkyl; phenyl or naphthyl which is unsubstituted or substituted by $C_1$–$C_4$alkyl, $X_1$ is a direct bond, oxygen, sulfur $$\diagdown\!\!\!\!\!\!\diagup\!\!\!\!\!\!\!\text{C}=\text{O},$$

$C_1$–$C_{18}$alkylene, $C_2$–$C_{18}$alkylene which is interrupted by oxygen or sulfur; $C_2$–$C_{18}$alkenylene, $C_2$–$C_{18}$alkenylene, $C_2$–$C_{20}$alkylidene, $C_7$–$C_{20}$phenylalkylidene or $C_5$–$C_8$cycloalkylene, with the proviso that, if m and n are 0, $X_1$ is other than oxygen and sulfur, m and n independently of one another are integers from 0 to 10, p is an integer from 0 to 4, s is an integer from 1 to 8, and ii) an aminosilane of the formula V in which $R_{17}$ and $R_{18}$ independently of one another are hydrogen, $C_1$–$C_{25}$alkyl, 2-hydroxyethyl, $C_3$–$C_{25}$alkyl which is interrupted by oxygen or sulfur; or is $C_2$–$C_{24}$alkenyl or $$-X_2-\text{Si}\diagup\!\!\!\!\!\!\!^{(R_{19})_b}_{(R_{20})_{4-b}}\!\!,$$

$R_{19}$ is $C_1$–$C_{25}$alkyl, $C_2$–$C_{25}$alkyl which is interrupted by oxygen or sulfur; or $C_2$–$C_{24}$alkenyl, $R_{20}$ is hydroxyl, $C_1$–$C_{18}$alkoxy or $C_2$–$C_{18}$alkoxy which is interrupted by oxygen or sulfur;

$R_{21}$ is hydrogen or $C_1$–$C_8$alkyl, $X_2$ is $C_1$–$C_{18}$alkylene, $C_2$–$C_{20}$alkylidene, $C_7C_{20}$phenylalkylidene, $C_5$–$C_8$cycloalkylene, phenylene or naphthylene which is unsubstituted or substituted by $C_1$–$C_4$alkyl; or is $C_4$–$C_{18}$alkylene which is interrupted by oxygen, sulfur or $$\diagdown\!\!\!\!\!\!\diagup\!\!\!\!\!\!\!\text{N}-R_{21},$$

with the proviso that two nitrogen atoms are not attached to the same carbon atom, a is 1 or 2, and b is 0, 1 or 2.

Also of interest are salts derived from i) a polyacrylic acid, an acrylic acid-maleic acid copolymer or a carboxylic acid of the formula I and ii) an aminosilane of the formula V in which $R_1$ is $C_1$–$C_{25}$alkyl, $C_2$–$C_{16}$alkenyl, 2-carboxy-4-methylcyclohexenyl, cyclohexyl, benzyl, —$COR_6$ or a radical of the formula II or III (II)

(III)

$R_2$, $R_3$, $R_4$ and $R_5$ independently of one another are hydrogen, $C_1$–$C_8$alkyl, phenyl, benzyl or —$COR_6$, $R_6$ is hydroxyl, $C_1$–$C_4$alkoxy or $$-\text{N}\diagup\!\!\!\!\!\!\!^{R_{15}}_{R_{16}},$$

$R_7$ is hydrogen or $C_1$–$C_4$alkyl, $R_8$ is hydrogen, hydroxyl, $C_1$–$C_4$alkyl, nitro or chlorine, $R_9$ is hydrogen or $C_1$–$C_4$alkyl, $R_{10}$ is hydrogen, $C_1$–$C_4$alkyl, nitro, chlorine or —$COR_6$, $R_{11}$ is hydrogen or $C_1$–$C_4$alkyl, $R_{12}$ is chlorine, $C_1$–$C_4$alkyl or $C_1$–$C_4$alkoxy, $R_{15}$ and $R_{16}$ independently of one another are hydrogen or $C_1$–$C_4$alkyl, $R_{17}$ and $R_{18}$ independently of one another are hydrogen or $C_1$–$C_4$alkyl, $R_{19}$ is $C_1$–$C_6$alkyl, $C_2$–$C_6$alkenyl, hydroxyl or $C_1$–$C_4$alkoxy, $R_{20}$ is hydroxyl or $C_1$–$C_4$alkoxy, and, if a and b together are 1, three radicals $R_{20}$ together are $N(CH_2CH_2O—)_3$, $R_{21}$ is hydrogen or $C_1$–$C_4$alkyl, $X_1$ is a direct bond, sulfur $$\diagdown\!\!\!\!\!\!\diagup\!\!\!\!\!\!\!\text{C}=\text{O}$$

or $C_1$–$C_{10}$alkylene, with the proviso that, if m and n are 0, $X_1$ is other than sulfur, $X_2$ is $C_2$–$C_6$alkylene, cyclohexylene, or $C_4$–$C_8$alkylene which is interrupted by $$\diagdown\!\!\!\!\!\!\diagup\!\!\!\!\!\!\!\text{N}-R_{21},$$

with the proviso that two nitrogen atoms are not attached to the same carbon atom, a is 1, b is 0 or 1, m and n independently of one another are 0, 1 or 2, and p is 0 or 1.

There is particular interest in salts derived from i) a polyacrylic acid, an acrylic acid-maleic acid copolymer or a carboxylic acid of the formula I and ii) an aminosilane of the formula V in which $R_1$ is $C_1-C_{18}$alkyl, 2-carboxy-4-methylcyclohexenyl, —$COR_6$ or a radical of the formula II or III

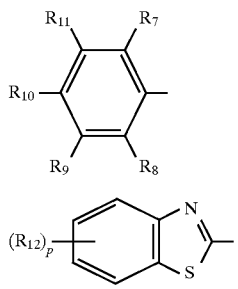

$R_2$ is hydrogen, $R_3$ is hydrogen or —$COR_6$, $R_4$ and $R_5$ are hydrogen, $R_6$ is hydroxyl, $R_7$ is hydrogen, $R_8$ is hydrogen, hydroxyl, $C_1-C_4$alkyl, nitro or chlorine, $R_9$ is hydrogen, $R_{10}$ is hydrogen, $C_1-C_4$alkyl or nitro, $R_{11}$ is hydrogen, $R_{17}$ and $R_{18}$ are hydrogen or methyl, $R_{19}$ is $C_1-C_4$alkyl, hydroxyl or $C_1-C_4$alkoxy, $R_{20}$ is hydroxyl or $C_1-C_4$alkoxy, and, if a and b together are 1, three radicals $R_{20}$ together are $N(CH_2CH_2O—)_3$, $R_{21}$ is hydrogen, $X_1$ is a direct bond, sulfur

or $C_1-C_8$alkylene with the proviso that, if m and n are 0, $X_1$ is other than sulfur, $X_2$ is $C_2-C_4$alkylene, or $C_4-C_6$alkylene which is interrupted by

with the proviso that two nitrogen atoms are not attached to the same carbon atom, a is 1, b is 0 or 1, m and n independently of one another are 0 or 1, and p is 0.

The novel salts and amides derived from i) a polyacrylic acid, an acrylic acid-maleic acid copolymer or a carboxylic acid of the formula I and ii) an aminosilane of the formula V can be prepared in a manner known per se.

Equimolar quantities of the carboxylic acids of the formula I and aminosilanes of the formula V are preferably mixed with one another in a temperature range from 10° to 80° C., in particular at from room temperature to 60° C. Where the carboxylic acid of the formula I has two or more —COOH groups in the molecule, one equivalent of aminosilane is employed for each individual —COOH group. Where the reactants are partially crystalline, the formation of salt or of amide is advantageously carried out in a solvent. Suitable solvents are water, organic solvents or aqueous-organic solvents. Examples of organic solvents are ketones, for example acetone, methyl ethyl ketone or cyclohexanone; esters, for example ethyl acetate or isopropyl acetate; alcohols, for example methanol, ethanol, isopropanol, n-butanol, glycol, glycerol, ethylene glycol or methoxyethanol; hydrocarbons, for example pentane, hexane, heptane, octane, benzene, toluene or xylene; ethers, for example diethyl ether, dibutyl ether, tetrahydrofuran or dioxane; or amides, for example dimethylformamide, dimethylacetamide or N-methylpyrrolidone.

The carboxylic acids of the formula I are known in the literature and their preparation is described in the references mentioned at the outset. Numerous carboxylic acids of the formula I are commercially available.

Polyacrylic acids or acrylic acid-maleic acid copolymers are known in the literature and are described for example in "Ullmann's Encyclopedia of Industrial Chemistry, Volume A 21", pages 143–156 (1992).

The aminosilanes of the formula V are likewise known in the literature or can be prepared in analogy to J. L. Speier et al., J. Org. Chem. 3, (21), 3120–3126 (1971); L. Birkofer et al., Chapter 10, pages 655 to 751 in S. Patai, Z. Pappoport "The Chemistry of Organic Silicon Compounds", John Wiley & Sons Ltd., 1989; or E. P. Plueddemann, "Silane Coupling Agents", Plenum Press 1982, pages 1–233. Many of the specifically preferred aminosilanes are obtainable from Fluka A G.

The examples which follow illustrate the invention in more detail. Parts and percentages are by weight.

EXAMPLE 1

General Instructions For the Preparation of the Salts Derived From the Carboxylic Acid of the Formula I and From the Aminosilane of the Formula V [Compounds (101) to (117), Table 1]

0.20 mol of aminosilane of the formula V is charged under a nitrogen atmosphere to a sulfonating flask fitted with mechanical stirrer and thermometer. 0.20 mol of the relevant carboxylic acid of the formula I is then added with thorough stirring, and stirring is continued at room temperature for one hour. In the case of sebacic acid [Compound (112)] and of 2-mercaptobenzothiazolylsuccinic acid [®Irgacor 252 (Ciba-Geigy), [Compound (113)] 2 equivalents of aminosilane are used. If the carboxylic acid of the formula I has not dissolved completely, the reaction mixture is heated briefly at from 40° to 60° C. The novel salts are obtained in quantitative yield. The results are collated in Table 1.

TABLE 1

| Compound | Carboxylic acid of the formula I | Aminosilane of the formula V | Appearance of the salt | C (%), (calculated/found) | H (%), | N (%) |
|---|---|---|---|---|---|---|
| 101 | Acetic acid | A | colourless liquid | 46.95 | 8.67 | 4.98 |
|  |  |  |  | 46.97 | 9.61 | 4.99 |
| 102 | Heptanoic acid | A | yellowish liquid | 54.66 | 10.61 | 3.98 |
|  |  |  |  | 54.72 | 10.97 | 3.94 |
| 103 | Lauric acid | A | colourless oil | 59.81 | 11.23 | 3.32 |
|  |  |  |  | 60.06 | 11.33 | 3.32 |
| 104 | Stearic acid | A | colourless oil | 64.11 | 11.76 | 2.77 |
|  |  |  |  | 64.03 | 11.64 | 2.77 |
| 105 | Benzoic acid | A | colourless oil | 55.98 | 8.45 | 4.08 |
|  |  |  |  | 55.97 | 8.56 | 4.17 |
| 106 | Salicylic acid | A | colourless oil | 53.53 | 8.07 | 3.89 |
|  |  |  |  | 53.08 | 8.44 | 3.81 |
| 107 | o-Toluic acid | A | white powder | 57.11 | 8.67 | 3.91 |
|  |  |  |  | 55.82 | 8.69 | 3.75 |
| 108 | o-Nitro-benzoic acid | A | yellow oil | 49.47 | 7.26 | 7.21 |
|  |  |  |  | 48.62 | 7.30 | 7.11 |
| 109 | p-Nitro-benzoic acid | A | yellow powder | 49.47 | 7.26 | 7.21 |
|  |  |  |  | 48.81 | 7.38 | 7.18 |
| 110 | o-Chloro benzoic acid | A | yellow resin | 50.85 | 7.40 | 3.70 |
|  |  |  |  | 50.38 | 7.60 | 3.59 |
| 111 | D | A | yellowish liquid | 58.08 | 8.53 | 3.39 |
|  |  |  |  | 58.16 | 8.53 | 3.32 |
| 112 | Sebacic acid | A* | white powder | 52.22 | 9.99 | 4.35 |
|  |  |  |  | 50.70 | 9.90 | 4.10 |
| 113 | E | A* | orange oil | 47.97 | 7.64 | 5.79 |
|  |  |  |  | 47.61 | 7.74 | 5.66 |
| 114 | D | B | yellowish liquid | 59.40 | 8.60 | 3.65 |
|  |  |  |  | 59.01 | 8.60 | 3.65 |
| 115 | Benzoic acid | B | yellow oil | 57.47 | 8.68 | 4.47 |
|  |  |  |  | 57.44 | 8.67 | 4.47 |
| 116 | D | C | yellow oil | 55.18 | 8.04 | 6.77 |
|  |  |  |  | 54.50 | 8.19 | 6.87 |
| 117 | E | C* | orange resin | 44.50 | 7.28 | 9.61 |
|  |  |  |  | 44.05 | 7.26 | 9.73 |

*2 equivalents of aminosilane of the formula V employed
A = 3-Aminopropyltriethoxysilane (Fluka 09324)
B = 3-Aminopropylmethyldiethoxysilane (Fluka 09309)
C = 3-(2-Aminoethylamino)propyltrimethoxysilane (Fluka 06668)
D = 3-(4-Methylbenzoyl)propionic acid
E = 2-Mercaptobenzothiazolylsuccinic acid [ ®Irgacor 252 (Ciba-Geigy)]

EXAMPLE 2

Preparation of the Salt Derived From Lauric Acid and 3-aminopropyldihydroxyethoxysilane [Compound (118)]

0.10 mol of 3-aminopropyltriethoxysilane is charged under a nitrogen atmosphere to a sulfonating flask. 0.20 mol of water and 0.10 mol of lauric acid are then added with thorough stirring, and stirring is continued at room temperature for one hour. The salt derived from lauric acid and 3-aminopropyldihydroxyethoxysilane [Compound (118)] is obtained in quantitative yield as an 80% solution in ethanol.

EXAMPLE 3

Preparation of the Salt Derived from Lauric Acid and 3-aminopropyltrihydroxysilane [Compound (119)]

0.10 mol of 3-aminopropyltriethoxysilane is charged under a nitrogen atmosphere to a sulfonating flask. 0.30 mol of water and 0.10 mol of lauric acid are then added with thorough stirring, and stirring is continued at room temperature for one hour. The salt derived from lauric acid and 3-aminopropyltrihydroxysilane [Compound (119)] is obtained in quantitative yield as a 72% solution in ethanol.

EXAMPLE 4

Preparation of the Amide Derived From Lauric Acid and 3-aminopropyltriethoxysilane [Compound (120)]

0.10 mol of lauroyl chloride is added dropwise with thorough stirring at 0° C. to a solution of 0.10 mol of 3-aminopropyltriethoxysilane and 0.10 mol of triethylamine in 500 ml of toluene. The suspension is then stirred at room temperature for two hours. The triethylamine hydrochloride is filtered off and the filtrate is concentrated on a rotary evaporator under vacuum. The amide derived from lauric acid and 3-aminopropyltriethoxysilane [Compound (120), white wax, yield 86%] is obtained. Elemental analysis: calculated for $C_{21}H_{45}O_4SiN$: C 62.48; H 11.24; N 3.47%. found: C 62.55; H 11.17; N 3.20%

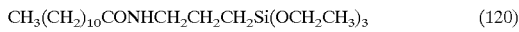

$$CH_3(CH_2)_{10}CONHCH_2CH_2CH_2Si(OCH_2CH_3)_3 \quad (120)$$

EXAMPLE 5

Preparation of a 1:1 Salt/Amide Mixture Derived From Lauric Acid and 3-aminopropyltriethoxysilane [Compound (121)]

0.10 mol of 3-aminopropyltriethoxysilane and 17.2 g of ethanol are charged under a nitrogen atmosphere to a sulfonating flask. 0.05 mol of lauric anhydride is then added with thorough stirring, and stirring is continued at room temperature for one hour. A 1:1 salt/amide mixture derived from lauric acid and 3-aminopropyltriethoxysilane [Compound (121)] is obtained as a 70% solution in ethanol [50 parts of compound (103) and 50 parts of compound (120)].

EXAMPLE 6

Preparation of a Mixed Amide Salt Derived From Succinic Acid and 3-aminopropyltriethoxysilane [Compound (122)]

0.10 mol of 3-aminopropyltriethoxysilane is charged under a nitrogen atmosphere to a sulfonating flask. 0.05 mol of succinic anhydride is then added with thorough stirring, and stirring is continued at room temperature for one hour. The desired amide salt [Compound (122)] is obtained in quantitative yield as a colourless liquid. Elemental analysis: calculated for $C_{22}H_{50}O_9Si_2N_2$: C 48.68; H 9.28; N 5.16%. found: C 46.92; H 9.17; N 5.20%.

$(CH_3CH_2O)_3SiCH_2CH_2CH_2NHCOCH_2CH_2COO^-H_3N^+$
$CH_2CH_2CH_2Si(OCH_2CH_3)_3$ (122)

EXAMPLE 7

Preparation of a Mixed Amide Salt Derived From Phthalic Acid and 3-aminopropyltriethoxysilane [Compound (123)]

0.10 mol of $^3$-aminopropyltriethoxysilane is charged under a nitrogen atmosphere to a sulfonating flask. 0.05 mol of phthalic anhydride is then added with thorough stirring, and stirring is continued at room temperature for one hour. The desired amide salt [Compound (123)] is obtained in quantitative yield as a colourless liquid. Elemental analysis: calculated for $C_{26}H_{50}O_9Si_2N_2$: C 52.85; H 8.53; N 4.74%. found: C 51.48; H 8.27; N 4.76%.

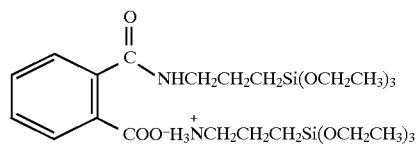
(123)

EXAMPLE 8

Preparation of a Mixed Amide Salt Derived From 4-methyl-4-cyclohexene-1,2-dicarboxylic Acid and 3-aminopropyltriethoxysilane [Compound (124)]

0.10 mol of 3-aminopropyltriethoxysilane and 6.0 g of ethanol are charged under a nitrogen atmosphere to a sulfonating flask. 0.05 mol of $^4$-methyl-4-cyclohexene-1,2-dicarboxylic anhydride is then added with thorough stirring, and stirring is continued at room temperature for one hour. The desired amide salt [Compound (124)] is obtained in quantitative yield as an 80% solution in ethanol.

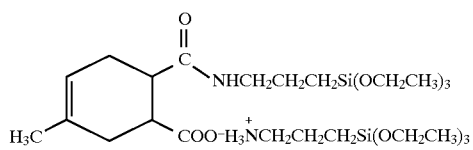
(124)

EXAMPLE 9

Preparation of a Mixed Amide Salt Derived From 2-dodecenylsuccinic Acid and 3-aminopropyltriethoxysilane [Compound (125)]

0.10 mol of 3-aminopropyltriethoxysilane and 11.2 g of ethanol are charged under a nitrogen atmosphere to a sulfonating flask. 0.05 mol of 2-dodecenylsuccinic anhydride is then added with thorough stirring, and stirring is continued at room temperature for one hour. The desired amide salt [Compound (125)] is obtained in quantitative yield as a 70% solution in ethanol.

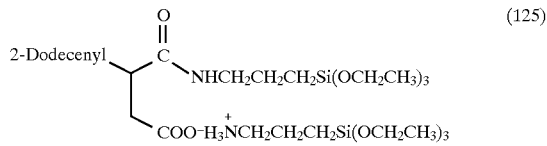
(125)

EXAMPLE 10

Preparation of a 1:1 Amide/Salt Mixture Derived From Lauric Acid, 3-aminopropyltriethoxysilane and 3-aminopropyldiethoxyhydroxysilane [Compound (126)]

A 70% solution of compound (103) [Example 1] in ethanol is boiled under reflux for 4 hours under a nitrogen atmosphere. An approximately 1:1 mixture [Compound (126)] of the compound (120) [Example 4] and of the Compound (127) is obtained as an approximately 70% solution in ethanol.

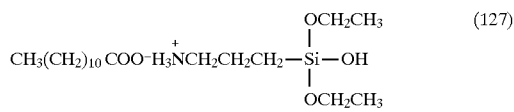
(127)

EXAMPLE 11

Preparation of a 7:3 Amide/Salt Mixture Derived From Lauric Acid, 3-aminopropyltriethoxysilane and 3-aminopropyldiethoxyhydroxysilane [Compound (128)]

A 70% solution of compound (103) [Example 1] in ethanol is boiled under reflux for 8 hours under a nitrogen atmosphere. An approximately 7:3 mixture [Compound (128)] of the compound (120) [Example 4] and of the Compound (127) is obtained as an approximately 70% solution in ethanol.

EXAMPLE 12

Preparation of the Salt Derived From Lauric Acid and 3-aminopropylsilatrane [Compound (129)]

0.10 mol of 3-aminopropylsilatrane [U.S. Pat. No. 4,048,206, Example 24] and 18.6 g of ethanol are charged under a nitrogen atmosphere to a sulfonating flask. 0.10 mol of lauric acid is then added with thorough stirring, and stirring is continued at room temperature for one hour. The salt derived from lauric acid and 3-aminopropylsilatrane [Compound (129)] is obtained ill quantitative yield as a 70% solution in ethanol.

EXAMPLE 13

Preparation of the Silatranamide Salt Derived From Lauric Acid and 3-aminopropylsilatrane (Compound (130)]

0.10 mol of 3-aminopropyltriethoxysilane, 0.10 mol of triethanolamine and 0.50 ml of a 3% sodium methylate solution are charged under a nitrogen atmosphere to a sulfonating flask and are heated to 60° C. The homogeneous reaction solution is stirred at 60° C. for 2 hours and then cooled to room temperature. Subsequently, 0.10 mol of lauric anhydride is added with thorough stirring, and stirring is then continued at room temperature for one hour. The silatranamide salt [Compound (130)] is obtained as an 82% solution in ethanol.

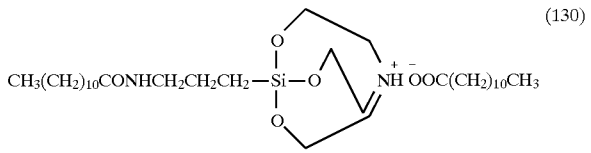

(130)

EXAMPLE 14

Preparation of the Salt Derived from Lauric Acid and N,N'-dimethyl-3-aminopropyltrimethoxysilane [Compound (131)]

In analogy to Example 1, the salt [Compound (131)] is prepared from 0.10 mol of lauric acid and 0.10 mol of N,N'-dimethyl-3-aminopropyltrimethoxysilane. Elemental analysis: calculated for $C_{20}H_{45}O_5SiN$: C 58.93; H 11.13; N 3.44%. found: C 58.94; H 11.07; N 3.22%.

EXAMPLE 15

Preparation of the Salt Derived From Polyacrylic Acid (MW about 2000) and 3-aminopropyltriethoxysilane [Compound (132)]

9.8 g of polyacrylic acid (Aldrich; molecular weight about 2000; 10.2 mol of COOH/kg) and 33 g of ethanol are charged under a nitrogen atmosphere to a sulfonating flask. 1.0 mol of 3-aminopropyltriethoxysilane is added with thorough stirring, and stirring is then continued at 40° C. for 2 hours. The salt derived from the polyacrylic acid and 3-aminopropyltriethoxysilane [Compound (132)] is obtained as a 50% solution in ethanol.

EXAMPLE 16

Preparation of the Salt Derived From Polyacrylic Acid (MW about 20 000) and 3-aminopropyltriethoxysilane [Compound (133)]

7.1 g of polyacrylic acid (Aldrich; molecular weight about 20 000; 13.3 mol of COOH/kg) and 30.8 g of ethanol are charged under a nitrogen atmosphere to a sulfonating flask. 0.10 mol of 3-aminopropyltriethoxysilane is added with thorough stirring, and stirring is then continued at 40° C. for 2 hours. The salt derived from the polyacrylic acid and 3-aminopropyltriethoxysilane [Compound (133)] is obtained as a 50% solution in ethanol.

EXAMPLE 17

Preparation of the Salt Derived From Polyacrylic Acid (MW about 250 000) and 3-aminopropyltriethoxysilane [Compound (134)]

7.3 g of polyacrylic acid (Aldrich; molecular weight about 250 000; 13.7 mol of COOH/g) and 91.5 g of ethanol are charged under a nitrogen atmosphere to a sulfonating flask. 0.10 mol of 3-aminopropyltriethoxysilane is added with thorough stirring, and stirring is then continued at 40° C. for 2 hours. The salt derived from the polyacrylic acid and 3-aminopropyltriethoxysilane [Compound (134)] is obtained as a 25% solution in ethanol.

EXAMPLE 18

Preparation of the Salt Derived From Acrylic Acid-maleic Acid copolymer (MW about 3000) and 3-aminopropyltriethoxysilane [Compound (135)]

7.5 g of acrylic acid-maleic acid copolymer (Aldrich; molecular weight about 3000; 13.3 mol of COOH/kg) and 71 g of ethanol are charged under a nitrogen atmosphere to a sulfonating flask. 0.10 mol of 3-aminopropyltriethoxysilane is added with thorough stirring, and stirring is then continued at 40° C. for 2 hours. The salt derived from the acrylic acid-maleic acid copolymer and 3-aminopropyltriethoxysilane [Compound (135)] is obtained as a 30% solution in ethanol.

EXAMPLE 19

Testing of the Novel Salts in a Water-dilutable 2-component Epoxy Resin Anticorrosion Primer Based on Beckopox EP 384 W/Beckopox EP 075/ Beckopox EH 623 W as Corrosion Inhibitors The coating composition based on Beckopox EP 384 W/Beckopox EP 075/Beckopox EH 623 W is prepared by employing components 1 to 8 (formulation without corrosion inhibitor) or components 1 to 9 (formulation with corrosion inhibitor) in the stated sequence (component A, cf. Table 2). The quantity in which the novel corrosion inhibitors are employed is based on the overall solids content of the total formulation without corrosion inhibitor (overall solids content: 62%). Accordingly, for example, an addition of 0.5% corrosion inhibitor to 166.7 g of primer implies a quantity of 0.51 g.

TABLE 2

Water-dilutable 2-component epoxy resin anticorrosion primer based on Beckopox EP 384 W/Beckopox EP 075/Beckopox EH 623 W

| Composition | % by weight |
|---|---|
| Component A: | |
| 1) Beckopox EH 623 W(80% Supply form)[a] | 14.4 |
| 2) Deionised water | 29.2 |
| 3) Talkum AT Extra[b] | 13.8 |
| 4) Bayferrox 130 M[c] | 12.0 |
| 5) Millicarb[d] | 27.3 |
| 6) Bentone SD 2[e] | 0.70 |
| 7) Borchigel L 75(25% supply form)[f] | 1.70 |
| 8) Additol XL 270[g] | 0.9 |
| 9) Novel corrosion inhibitor | |
| Total | 100.00 |
| Component B: | |
| 10) Beckopox EP 384 W(54% supply form)[h] | 63.0 |
| 11) Beckopox EP 075[i] | 3.7 |

[a] ® Beckopox EH 623 W: polyamine hardener (Hoechst AG);
[b] ® Talkum AT Extra: Norwegian;
[c] ® Bayferrox 130 M: iron oxide red (Bayer AG);
[d] ® Millicarb: calcium carbonate (Omya);
[e] ® Benton SD 2: anti-settling agent (Kronos Titan GmbH);
[f] ® Borchigel L 75: thickener/rheology improver (Gebr. Borchers AG);
[g] ® Additol XL 270: antifloating/dispersion auxiliary (Hoechst AG);
[h] ® Beckopox EP 384 W: epoxy resin (Hoechst AG);
[i] ® Beckopox EP 075: reactive diluent (polypropylene glycol diglycidyl ether, Hoechst AG).

The resulting component A (formulation with and without corrosion inhibitor) is dispersed to a particle fineness<15 $\mu$m using a horizontal ball mill. The result of dispersion is assessed by determining the grindometer value (ISO 1524).

For application, 100 g (formulation without anticorrosion additive) or 100+X g (formulation with corrosion inhibitor)

are mixed with 66.7 g of component B. To adjust to the desired spray viscosity, the coating material is diluted with demineralized water. It is applied to steel panels (19×10.5 cm) of the Bonder type (cold-rolled degreased steel; manufacturer: Chemetall, Frankfurt am Main/Germany) in a coat thickness which, after drying, is 60–65 μm (Table 3 and 5) or 50–55 μm (Table 4 and 6). Drying conditions: 10 days at room temperature.

Before the commencement of weathering, the "coating films" are subjected to defined damage in the form of a parallel cut (i.e. parallel to the longest panel edge) using a Bonder cross-hatch instrument (Model 205; manufacturer/marketing: Lau, Hemer/Germany). The panel edges are protected by applying an edge protector (®Icosit 255; manufacturer: Inertol AG, Winterthur, Switzerland).

The samples are then subjected to rapid weathering by the salt spray test (DIN 50 021 SS) for 168, 230, 500 and 1200 hours and to a humidity test (ASTM D 4585-87) for 500 hours. The results are compiled in Tables 3 to 11. The results are evaluated based on the relevant DIN standards according to an evaluation key, by indicating a corrosion protection factor CPF. The CPF is an additive factor based on assessment of the coating (film) and an assessment of visible subfilm corrosion and the appearance of the metal surface, and has a maximum value of 12 points. The individual maximum values are 6 points in each case. The larger the numbers, the better the protection from corrosion.

As a further assessment criterion, after the end of the salt spray test and in accordance with DIN 53 167, the subfilm migration in the wet state (cathodic delamination) along the site of deliberate damage is determined. The lower the level of delamination, the more effective the corrosion inhibitor tested. After the end of the humidity test, the wet adhesion of the coating formulations is determined in accordance with DIN 53 151 by applying a cross-hatch with the tape tear-off test. According to DIN 53 151 (Scale from Gt 0 to Gt 5), a cross-hatch value of Gt 0 corresponds to completely intact adhesion of the coating film, whereas Gt 5 corresponds to inadequate adhesion.

TABLE 3

Salt spray test, 168 hours, coat thickness 60–65 μm

| Compound | CPF film | CPF metal | CPF | Cathodic delamination (mm total) |
| --- | --- | --- | --- | --- |
| — | 2.0 | 2.0 | 4.0 | 105 |
| 0.2% (105) | 4.6 | 4.2 | 8.8 | 8 |
| 0.5% (105) | 5.0 | 4.2 | 9.2 | 6 |
| 0.2% (106) | 4.6 | 4.2 | 8.8 | 5 |
| 0.5% (106) | 5.2 | 4.2 | 9.4 | 5 |
| 0.2% (111) | 4.8 | 4.2 | 9.0 | 7 |
| 0.5% (111) | 4.6 | 5.0 | 9.6 | 7 |
| 0.2% (113) | 4.6 | 4.0 | 8.6 | 8 |
| 0.5% (113) | 5.0 | 4.2 | 9.2 | 7 |

TABLE 4

Salt spray test, 168 hours; coat thickness 60–65 μm

| Compound | CPF Film | CPF Metal | CPF | Cathodic delamination (mm total) |
| --- | --- | --- | --- | --- |
| — | 2.8 | 1.6 | 4.4 | 105 |
| 0.5% (123) | 5.0 | 5.0 | 10.0 | 4 |
| 0.8% (123) | 5.0 | 5.0 | 10.0 | 4 |

TABLE 4-continued

Salt spray test, 168 hours; coat thickness 60–65 μm

| Compound | CPF Film | CPF Metal | CPF | Cathodic delamination (mm total) |
| --- | --- | --- | --- | --- |
| 0.5% (124) | 5.0 | 4.8 | 9.8 | 8 |
| 0.5% (125) | 5.0 | 5.0 | 10.0 | 4 |
| 0.8% (125) | 5.0 | 5.0 | 10.0 | 4 |

TABLE 5

Salt spray test, 168 hours; coat thickness 50–55 μm

| Compound | CPF Film | CPF Metal | CPF | Cathodic delamination (mm total) |
| --- | --- | --- | --- | --- |
| — | 2.4 | 2.0 | 4.4 | 105 |
| 0.2% (101) | 4.8 | 3.8 | 8.6 | 10 |
| 0.5% (101) | 3.6 | 3.8 | 7.4 | 12 |
| 0.2% (102) | 5.0 | 5.0 | 10.0 | 6 |
| 0.8% (102) | 5.0 | 4.5 | 9.5 | 4 |
| 0.2% (103) | 5.0 | 4.0 | 9.0 | 8 |
| 0.8% (103) | 5.0 | 4.5 | 9.5 | 4 |
| 0.2% (104) | 3.8 | 3.6 | 7.4 | 20 |
| 0.5% (104) | 4.0 | 3.6 | 7.6 | 20 |
| 0.2% (107) | 5.0 | 5.2 | 10.2 | 8 |
| 0.5% (107) | 5.0 | 5.0 | 10.0 | 6 |
| 0.2% (108) | 5.0 | 4.2 | 9.2 | 10 |
| 0.5% (108) | 5.0 | 5.2 | 10.2 | 6 |
| 0.2% (110) | 5.0 | 4.6 | 9.6 | 10 |
| 0.5% (110) | 5.0 | 4.8 | 9.8 | 6 |
| 0.2% (111) | 5.0 | 5.0 | 10.0 | 8 |
| 0.5% (111) | 5.2 | 5.3 | 10.5 | 6 |
| 0.2% (114) | 5.2 | 5.4 | 10.4 | 10 |
| 0.8% (114) | 5.4 | 5.4 | 10.8 | 6 |
| 0.2% (115) | 5.2 | 5.3 | 10.5 | 8 |
| 0.8% (115) | 5.4 | 5.0 | 10.4 | 4 |

TABLE 6

Salt spray test, 230 hours; coat thickness 60–65 μm

| Compound | CPF Film | CPF Metal | CPF | Cathodic delamination (mm total) |
| --- | --- | --- | --- | --- |
| — | 2.4 | 2.0 | 4.4 | 105 |
| 0.2% (126) | 3.8 | 4.0 | 7.8 | 22 |
| 0.2% (135) | 4.8 | 4.8 | 9.6 | 8 |

TABLE 7

Salt spray test, 500 hours; coat thickness; 60–65 μm

| Compound | CPF FIlm | CPF Metal | CPF | Cathodic delamination (mm total) |
| --- | --- | --- | --- | --- |
| — | 2.2 | 2.0 | 4.2 | 105 |
| 0.5% (120) | 2.6 | 2.5 | 5.1 | 65 |
| 0.8% (120) | 4.4 | 5.0 | 9.4 | 22 |

TABLE 8

Salt spray test, 1200 hours; coat thickness 60–65 μm

| Compound | CPF Film | CPF Metal | CPF | Cathodic delamination (mm total) |
|---|---|---|---|---|
| — | 2.3 | 0.6 | 2.9 | 105 |
| 0.5% (119) | 4.8 | 4.0 | 8.8 | 16 |
| 0.8% (119) | 4.8 | 4.0 | 8.8 | 12 |
| 0.5% (121) | 4.5 | 4.0 | 8.5 | 20 |
| 0.8% (121) | 4.5 | 4.0 | 8.5 | 20 |
| 0.5% (126) | 4.6 | 4.0 | 8.6 | 20 |
| 0.8% (126) | 4.6 | 4.0 | 8.6 | 15 |
| 0.5% (128) | 4.3 | 4.0 | 8.3 | 35 |
| 0.8% (128) | 4.5 | 4.0 | 8.5 | 20 |
| 0.5% (129) | 4.5 | 4.0 | 8.5 | 18 |

TABLE 9 humidity test, 500 hours; coat thickness 60–65 μm

| Compound | CPF Film | CPF Metal | CPF | Wet adhesion (Gt value) |
|---|---|---|---|---|
| — | 3.7 | 4.0 | 7.7 | 5 |
| 0.2% (105) | 5.6 | 5.4 | 11.0 | 0–1 |
| 0.5% (105) | 5.4 | 5.6 | 11.0 | 0 |
| 0.2% (106) | 4.8 | 5.6 | 10.4 | 0 |
| 0.2% (111) | 5.0 | 5.0 | 10.0 | 0 |
| 0.8% (111) | 4.8 | 5.4 | 10.2 | 0 |
| 0.2% (113) | 4.4 | 5.4 | 9.8 | 0–1 |

TABLE 10

Humidity test, 500 hours; coat thickness 60–65 μm

| Compound | CPF Film | CPF Metal | CPF | Wet adhesion (Gt value) |
|---|---|---|---|---|
| — | 2.6 | 2,0 | 4.6 | 5 |
| 0.5% (119) | 5.6 | 5.7 | 11.3 | 0 |
| 0.8% (119) | 5.4 | 5.7 | 11.1 | 0 |
| 0.5% (121) | 5.2 | 5.0 | 10.2 | 0 |
| 0.8% (121) | 5.2 | 5.4 | 10.6 | 0 |
| 0.5% (126) | 5.6 | 5.5 | 11.1 | 0 |
| 0.8% (126) | 5.4 | 5.4 | 10.8 | 0 |
| 0.5% (128) | 5.2 | 5.1 | 10.3 | 0 |
| 0.8% (128) | 5.4 | 5.4 | 10.8 | 0 |
| 0.5% (129) | 5.0 | 5.6 | 10.6 | 0 |

TABLE 11

Humidity test, 500 hours; coat thickness 50–55 μm

| Compound | CPF Film | CPF Metal | CPF | Wet adhesion (GT value) |
|---|---|---|---|---|
| — | 3.8 | 3.7 | 7.5 | 5 |
| 0.2% (101) | 6.0 | 5.6 | 11.6 | 0 |
| 0.2% (102) | 6.0 | 6.0 | 12.0 | 0 |
| 0.2% (103) | 6.0 | 5.8 | 11.8 | 0 |
| 0.8% (103) | 6.0 | 6.0 | 12.0 | 0 |
| 0.2% (104) | 5.2 | 5.0 | 10.2 | 1 |
| 0.5% (104) | 5,4 | 4.8 | 10.2 | 0 |
| 0.2% (107) | 5.2 | 6.0 | 11.2 | 1 |
| 0.5% (107) | 5.4 | 5.8 | 11.2 | 0 |
| 0.2% (108) | 5.4 | 5.5 | 10.9 | 0 |
| 0.5% (108) | 6.0 | 6.0 | 12.0 | 0 |
| 0.2% (110) | 5.5 | 5.5 | 11.0 | 0 |
| 0.5% (110) | 6.0 | 6.0 | 12.0 | 0 |
| 0.2% (111) | 6.0 | 5.8 | 11.8 | 0 |
| 0.5% (111) | 6.0 | 6.0 | 12.0 | 0 |
| 0.2% (114) | 3.8 | 4.3 | 8.1 | 0 |
| 0.8% (114) | 4.4 | 5.5 | 9.9 | 0 |
| 0.2% (115) | 5.6 | 5.5 | 11.1 | 0 |
| 0.5% (115) | 6.0 | 6.0 | 12.0 | 0 |

EXAMPLE 20

Testing of the Novel Salts in an Acrylic Dispersion Based on Maincoat HG-54 as Corrosion Inhibitors To prepare the coating composition based on Maincoat HG-54, components 1 to 8 (formulation without corrosion inhibitor) or components 1 to 9 (formulation comprising the corrosion inhibitors) are employed in the stated sequence (cf. Table 12).

TABLE 12

Acrylic dispersion based on Maincoat HG-54

| Composition | % by weight |
|---|---|
| 1) Deionised water | 3.10 |
| 2) Methylcarbitol[a] | 5.00 |
| 3) Orotan 165[b] | 0.82 |
| 4) Triton CF 10[c] | 0.29 |
| 5) Drew Plus TS 4380[d] | 0.28 |
| 6) Acrysol RM 8[e] | 0.60 |
| 7) Bayferrox 130 M[f] | 5.72 |
| 8) Millicarb[g] | 17.40 |
| 9) Novel corrosion inhibitor | |
| 10) Butyl diglycol | 3.67 |
| 11) Maincote HQ-54[h] | 58.70 |
| 12) Texanol[i] | 1.50 |
| 13) Dibutyl phthalate[k] | 1.50 |
| 14) Sodium nitrite (13.8% in $H_2O$)[l] | 0.80 |
| 15) Drew T 4310[m] | 0.32 |
| 16) Ammonia solution (25%) | 0.30 |
| Total | 100.00 |

Overall solids content: 47%; pH: 8 to 8.5;
[a]® Methylcarbitol: diethylene glycol monomethyl ether (Union Carbide);
[b]® Orotan 165: dispersion auxiliary (Rohm & Haas);
[c]® Triton CF 10: nonionic wetting agent (Rohm & Haas);
[d]® Drew Plus TS 4380: antifoam (Drew Chem. Corp.);
[e]® Acrysol RM 8: nonionic thickener (Rohm & Haas);
[f]® Bayferrox 130 M: iron oxide red (Bayer AG);
[g]® Millicarb: calcium carbonate (Omya);
[h]® Maincote HG-54: acrylic dispersion, 41.5% in deionized water (Rohm & Haas);
[i]® Texanol: coalescent (Eastman Chem. Prod., Inc.);
[k]dibutyl phthalate: plasticizer (Eastman Chem. Prod., Inc.);
[l]sodium nitrite: rust film inhibitor (Fluka);
[m]® Drew T 4310: nonionic antifoam (Drew Chem. Corp.).

Components 1 to 8 and 1 to 9 are dispersed using a high-speed stirrer at 3000 revolutions/minute to a (particle) fineness of <15 μm. The result of dispersion of the pigment paste thus obtained is assessed by determining the grindometer value (ISO 1524). The quantity employed of the novel corrosion inhibitors is based on the overall solids content of the formulation without additive (overall solids content: 47%). Consequently, for example, an addition of 0.5% corrosion inhibitor to 100 g of dispersion implies a quantity of 0.235 g. The novel corrosion inhibitor salts can also be prepared in situ by separate addition of weighed amounts of the respective carboxylic acid of the formula I and of the corresponding aminosilane of the formula V to the pigment paste. Accordingly, for the in situ preparation of corrosion inhibitor (103) according to Table 13, for example, it is necessary to employ, separately, 0.22 g of lauric acid and 0.25 g of 3-aminopropyltriethoxysilane to obtain a concentration of 1% of corrosion inhibitor (103).

To complete the preparation of the coating composition, components 10 to 16 as in Table 12 are added in the stated sequence, at a reduced stirring speed (1000 revolutions/minute). Subsequently, the pH of the formulation is checked and if necessary is adjusted prior to application with ammonia solution (25%) to a pH of from 8 to 8.5.

The coating composition can be applied in undiluted form by airless spraying, brushing or rolling or, after dilution, by conventional spraying. Dilution to the desired spray viscosity is made by adding butylglycol/water (1:1 w/w). In the present example, the coating composition is applied by conventional spraying.

The formulation is applied to steel panels (19 times 10.5 cm) of the Bonder type (cold-rolled degreased steel; manufacturer: Chemetall, Frankfurt am Main, Germany) in a coat thickness which after drying is 45–50 μm (drying conditions: 10 days at room temperature).

Before the commencement of weathering, the "coating films" are subjected to defined damage (70 times 0.5 mm) in the form of a parallel cut (i.e. parallel to the longest panel edge) using a Bonder cross-hatch instrument (model 205; manufacturer/marketing: Lau, 5870 Hemer/Germany). The panel edges are protected by applying an edge protector (®Icosit 255; manufacturer: Inertol AG, Winterthur, Switzerland).

The samples are then subjected to rapid weathering in the salt spray test (DIN 50 021 SS) for 168 hours and in a humidity test (ASTM D 4585-87) for 330 hours. The results are compiled in Tables 13 to 14. The results are evaluated based on the relevant DIN standards according to an evaluation key, by indicating a corrosion protection factor CPF. The CPF is an additive factor based on an assessment of the coating (film) and of the steel and has a maximum value of 12 points. The individual maximum values for the coating (film) and the steel are 6 points. The larger the numbers, the better the protection from corrosion.

As a further assessment criterion, after the end of the salt spray test and in accordance with DIN 53 167, the subfilm migration in the wet state (cathodic delamination) is determined along the site of deliberate damage. The lower the degree of delamination, the more effective the corrosion inhibitor tested. After the end of the humidity test, the wet adhesion of the coating formulations is determined in accordance with DIN 53 151 by applying a cross-hatch with the tape tear-off test According to DIN 53 151 (Scale from Gt 0 to Gt 5), a cross-hatch value of Gt 0 corresponds to a completely intact adhesion of the coating film, whereas Gt 5 corresponds to inadequate adhesion.

TABLE 13

Salt spray test, 168 hours; coat thickness 45–50 μm

| Compound | CPF Film | CPF Metal | CPF | Cathodic delamination (mm total) |
| --- | --- | --- | --- | --- |
| — | 3.0 | 3.6 | 6.6 | 105 |
| 0.5% (111) | 4.4 | 5.6 | 10.0 | 20 |
| 0.8% (111) | 4.4 | 4.5 | 9.9 | 12 |
| 1.0% (103) | 4.6 | 5.2 | 9.8 | 14 |
| 2.0% (103) | 4.8 | 5.0 | 9.8 | 5 |

TABLE 13-continued

Salt spray test, 168 hours; coat thickness 45–50 μm

| Compound | CPF Film | CPF Metal | CPF | Cathodic delamination (mm total) |
| --- | --- | --- | --- | --- |
| 0.22 g lauric acid 0.25 g aminosilane[a)] | 5.0 | 4.8 | 9.8 | 13 |
| 0.45 g lauric acid 0.49 g aminosilane[a)] | 5.0 | 4.6 | 9.6 | 7 |

[a)]3-Aminopropyltriethoxysilane (Fluka 09324)

0.22 g of lauric acid and 0.25 g of 3-aminopropyltriethoxysilane correspond to 1.0% of compound (103). 0.45 g of lauric acid and 0.49 g of 3-aminopropyltriethoxysilane correspond to 2.0% of compound (103).

TABLE 14

Humidity test, 330 hours; coat thickness 45–50 μm

| Compound | CPF Film | CPF Metal | CPF | Wet adhesion (Gt value) |
| --- | --- | --- | --- | --- |
| — | 3.0 | 0.6 | 3.6 | >5 |
| 0.5% (111) | 3.4 | 3.5 | 6.9 | 5 |
| 0.8% (111) | 3.4 | 4.0 | 7.4 | 2 |

EXAMPLE 21

Testing of the Novel Salts in Solvent-containing 2-component Epoxy Resin Formulations Based on ®Araldit GZ 7071/HY 815 as Corrosion Inhibitors To prepare the coating composition based on ®Araldit GZ 7071/HY 815, components 1 to 10 (formulation without corrosion inhibitor) or components 1 to 11 (formulation containing the corrosion inhibitors) are employed in the stated sequence (cf. Table 15). The quantity employed of the novel corrosion inhibitors is based on the overall solids content of the total formulation without corrosion inhibitor (overall solids content: 64.8%). Accordingly, for example, an addition of 0.5% corrosion inhibitor to 128.15 g of overall formulation implies a quantity of 0.41 g.

TABLE 15

2 component epoxy/polyamidoamine primer

| Composition | % by weight |
| --- | --- |
| Component A: | |
| 1) Araldit GZ 7071 (75% in xylene)[a)] | 24.2 |
| 2) Aerosil R 972[b)] | 0.5 |
| 3) Thixatrol ST[c)] | 0.2 |
| 4) Kronos RN 56[d)] | 25.0 |
| 5) Bayferrox 318 M[e)] | 0.1 |
| 6) Talkum AT Extra[f)] | 15.8 |
| 7) Blanc Fixe[g)] | 14.2 |
| 8) Cyclohexanone | 8.3 |
| 9) Xylene | 11.7 |
| 10) n-Butanol | 10.0 |
| 11) Novel corrosion inhibitor | |
| Total | 110.0 |

TABLE 15-continued 2 component epoxy/polyamidoamine primer

| Composition | % by weight |
|---|---|
| Component A: | |
| Component B: | |
| 12) Hardener HY 815 (50% in xylene)[h] | 18.15 |

Overall solids content: 64.8%;
[a] ® Araldit GZ 7071: epoxy resin (Ciba-Geigy AG);
[b] ® Aerosil R 972: hydrophobicized silicic acid, anti-settling/thickening agent (Degussa);
[c] ® Thixatrol ST: thioxtropic agent (NL-Chemicals);
[d] ® Kronos RN 56: titanium dioxide (Kronos Titan GmbH);
[e] ® Bayferrox 318 M: iron oxide black (Bayer AG);
[f] ® Talkum AT Extra: Norwegian;
[g] ® Blanc Fixe: barium sulfate (Sachtleben);
[h] ® Härter HY 815: polyamidoamine hardener (Ciba-Geigy AG).

The resulting component A (formulation with and without corrosion inhibitor) is dispersed to a particle fineness<15 μm using a horizontal ball mill. The result of dispersion is assessed by determining the grindometer value (ISO 1524).

To apply the coating composition, 110 g of components A (formulation without anticorrosion additive) or 110+X g (formulation with corrosion inhibitor) are mixed with 18.15 g of component B and the mixture is applied, after an induction time of 30 minutes, by spraying to steel panels (19×10.5 cm) of the Bonder type (cold-rolled degreased steel; manufacturer: Chemetall, Frankfurt am Main/Germany) in a coat thickness which after drying is 50 μm. Drying conditions: 10 days at room temperature. Adjustment to the desired spray viscosity is made by dilution with xylene.

Before the commencement of weathering, the "coating films" are subjected to defined damage in the form of parallel cut (i.e. parallel to the longest panel edge) using a Bonder cross-hatch instrument (model 205; manufacturer/marketing: Lau, Hemer/Germany). The panel edges are protected by applying an edge protector (®Icosit 255; manufacturer: Inertol AG, Winterthur, Switzerland).

The samples are subsequently subjected to rapid weathering by the salt spray test (DIN 50 021 SS) for 322 hours. The results are collated in Table 16. The evaluation of the results is made in analogy to Examples 19 and 20.

TABLE 16

Salt spray test, 322 hours; coat thickness 50 μm

| Comound | CPF Film | CPF Metal | CPF | Cathodic delamination (mm total) |
|---|---|---|---|---|
| — | 4.0 | 3.8 | 7.8 | 37 |
| 0.2% (111) | 4.8 | 4.7 | 9.5 | 13 |
| 2.0% (111) | 4.8 | 5.2 | 10.0 | 11 |

EXAMPLE 22

Testing of the Novel Salts in Solvent-containg 2-component One-coat Chassis Finishes Based on an Amine-functional and an Epoxy-functional Acrylate as Corrosion Inhibitors To prepare the coating composition, components 1 to 7 are employed in the stated sequence (Table 17) and then dispersed to a fineness of grind<15 μm on a horizontal ball mill. The result of dispersion is assessed by determining the grindometer value (ISO 1524).

TABLE 17

2-component one-coat finish based on Setalux AA EPL 2514/Setalux AA EPL 2515

| Composition | % by weight |
|---|---|
| Component A: | |
| 1) Setalux AA EPL 2514 (55% supply form)[a] | 26.60 |
| 2) Anti Tetta 203[b] | 0.05 |
| 3) Bayferrox 3920[c] | 16.00 |
| 4) Talkum AT Extra[d] | 6.00 |
| 5) Barium sulfate EWO[e] | 6.00 |
| 6) BYK 066[f] | 0.10 |
| 7) Butyl acetat/Solvesso 100[g]/ methoxypropyl acetate = 1:1:1 | 13.30 |
| 8) BYK 331[h] | 0.10 |
| 9) BYK 358[i] | 0.15 |
| 10) Butyl acetate/Solvesso 100[g]/ methoxypropyl acetate = 1:1:1 | 18.30 |
| 11) Novel corrosion inhibitor | |
| Component B: | |
| 12) Setalux AA EPL 2515 (60% supply form)[k] | 13.40 |
| Total | 100.00 |

Overall solids content: 53.6%;
[a] ® Setalux AA EPL 2514: amine-functional acrylic resin (Akzo Nobel);
[b] ® Anti Terra 203: antifloating agent (BYK-Chemie GmbH);
[c] ® Bayferrox 3920: iron oxide yellow (Bayer AG);
[d] ® Talkum AT Extra: Norwegian;
[e] barium sulfate EWO: Firma Lamberti;
[f] ® BYK 066: antifoam (BYK-Chemie GmbH);
[g] ® Solvesso 100: mixture of aromatics (Deutsche Exxon Chemical GmbH);
[h] ® BYK 331: levelling assistant (BYK-Chemie GmbH);
[i] ® BYK 358: levelling assistant (BYK-Chemie GmbH);
[k] ® Setalux AA EPL 2515: epoxy-functional acrylate (Akzo Nobel).

Then components 8, 9 and 10 (formulation without corrosion inhibitor) or components 8 to 11 (formulation containing the corrosion inhibitors) are added and the mixture is redispersed in order to homogenize the paint batch. The quantity of corrosion inhibitor employed is based on the overall solids content of the coating formulation (component A and B). For example, an added quantity of 1% implies a quantity of 0.536 g relative to 100 g of overall formulation.

For application, the finished component A is mixed with component B and the mixture is then applied by spraying to steel panels (19×10.5 cm) of the Bonder type (cold-rolled degreased steel; manufacturer: Chemetall, Frankfurt am Main/Germany) in a coat thickness which after drying is 45–50 μm. Drying conditions: 10 days at room temperature.

Before the commencement of weathering, the "coating films" are subjected to defined damage in the form of a parallel cut (i.e. parallel to the longest panel edge) using a Bonder cross-hatch instrument (model 205; manufacturer/marketing: Lau, Hemer/Germany). The panel edges are protected by applying an edge protector (®Icosit 255; manufacturer: Inertol AG, Winterthur, Switzerland).

The samples are subsequently subjected to rapid weathering in a salt spray test (DIN 50 021 SS) for 216 hours. The results are collated in Table 18. The evaluation of the results is made in analogy to Examples 19 and 20.

TABLE 18

Salt spray test, 216 hours; coat thickness 45–50 μm

| Compound | CPF Film | CPF Metal | CPF | Cathodic delamination (mm total) |
|---|---|---|---|---|
| — | 3.2 | 2.7 | 5.9 | 105 |
| 1.4% (111) | 4.0 | 5.0 | 9.0 | 12 |

What is claimed is:

1. A coating composition comprising
   a) an organic film-forming binder and
   b) as corrosion inhibitor at least one salt (α) and/or at least one amide (β), both components (α) and (β) derived from i) a polyacrylic acid, an acrylic acid-maleic acid copolymer, or a carboxylic acid of the formula I

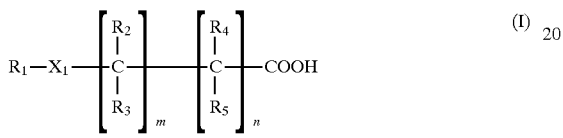

in which $R_1$ is hydrogen, $C_1$–$C_{25}$alkyl, $C_2$–$C_{25}$alkyl interrupted by oxygen or sulfur; $C_2$–$C_{24}$alkenyl, $C_4$–$C_{15}$cycloalkyl which is unsubstituted or substituted by $C_1$–$C_4$allyl and/or carboxyl; $C_5$–$C_{15}$cycloalkenyl which is unsubstituted or substituted by $C_1$–$C_4$alkyl and/or carboxyl; $C_{13}$–$C_{26}$polycycloalkyl, $C_7$–$C_9$phenylalkyl which is unsubstituted or substituted on the phenyl ring by $C_1$–$C_4$alkyl; —$COR_6$, a 5- or 6-membered heterocyclic ring which is unsubstituted or substituted by $C_1$–$C_4$alkyl, $C_1$–$C_4$alkoxy, halogen or carboxyl; a 5- or 6-membered heterocyclic ring which is benzo-fused and is unsubstituted or substituted by $C_1$–$C_4$alkyl, $C_1$–$C_4$alkoxy, halogen or carboxyl; or else $R_1$ is a radical of the formula II, III or IV

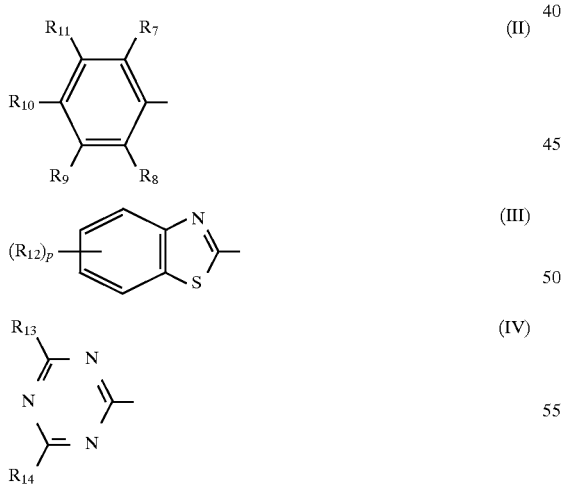

$R_2$, $R_3$, $R_4$ and $R_5$ independently of one another are hydrogen, hydroxyl, $C_1$–$C_{18}$alkoxy, $C_2$–$C_{18}$alkoxy which is interrupted by oxygen or sulfur; $C_1$–$C_{25}$alkyl, $C_2$–$C_{25}$alkyl which is interrupted by oxygen or sulfur; $C_2$–$C_{24}$alkenyl, $C_5$–$C_{15}$cycloalkyl which is unsubstituted or substituted by $C_1$–$C_4$alkyl; $C_5$–$C_{15}$cycloalkenyl which is unsubstituted or substituted by $C_1$–$C_4$alkyl; phenyl or naphthyl which is unsubstituted by $C_1$–$C_4$alkyl; $C_7$–$C_9$phenylalkyl which is unsubstituted or substituted on the phenyl ring by $C_1$–$C_4$alkyl; $C_{10}$–$C_{12}$naphthylalkyl which is unsubstituted or substituted on the naphthyl ring system by $C_1$–$C_4$alkyl; or are —$COR_6$, with the proviso that, if one of the radicals $R_2$, $R_3$, $R_4$ and $R_5$ is hydroxyl, the other radical attached to the same carbon atom is other than hydroxyl; or else $R_2$ and $R_3$ or $R_4$ and $R_5$, together with the carbon atom to which they are attached, form an unsubstituted or $C_1$–$C_4$alkyl-substituted $C_5$–$C_{12}$cycloalkylidene ring, $R_6$ is hydroxyl, $C_1$–$C_{18}$alkoxy, $C_2$–$C_{18}$alkoxy which is interrupted by oxygen or sulfur; or

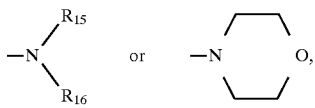

$R_7$, $R_8$, $R_9$, $R_{10}$ and $R_{11}$ independently of one another are hydrogen, hydroxyl, halogen, nitro, cyano, $CF_3$, —$COR_6$, $C_1$–$C_{25}$alkyl, $C_2$–$C_{25}$alkyl which is interrupted by oxygen or sulfur; $C_1$–$C_{25}$haloalkyl, $C_1$–$C_{18}$alkoxy, $C_2$–$C_{18}$alkoxy which is interrupted by oxygen or sulfur; $C_1$–$C_{18}$alkylthio, $C_2$–$C_{24}$alkenyl, $C_5$–$C_{15}$cycloalkyl which is unsubstituted or substituted by $C_1$–$C_4$alkyl; $C_5$–$C_{15}$cycloalkenyl which is unsubstituted or substituted by $C_1$–$C_4$alkyl; phenyl or naphthyl which is unsubstituted or substituted by $C_1$–$C_4$alkyl; $C_7$–$C_9$phenylalkyl which is unsubstituted or substituted on the phenyl ring by $C_1$–$C_4$alkyl; $C_{10}$–$C_{12}$naphthylalkyl which is unsubstituted or substituted on the naphthyl ring system by $C_1$–$C_4$alkyl; phenoxy or naphthoxy which is unsubstituted or substituted by $C_1$–$C_4$alkyl; $C_7$–$C_9$phenylalkoxy which is unsubstituted or substituted on the phenyl ring by $C_1$–$C_4$alkyl; $C_{10}$–$C_{12}$naphthylalkoxy which is unsubstituted or substituted on the naphthyl ring system by $C_1$–$C_4$alkyl; or else the radicals $R_8$ and $R_9$ or the radicals $R_9$ and $R_{10}$ or the radicals $R_{10}$ and $R_{11}$ or the radicals $R_7$ and $R_{11}$, together with the carbon atoms to which they are attached, form an unsubstituted or $C_1$–$C_4$alkyl-, halogen- or $C_1$–$C_4$alkoxy-substituted benzo ring, with the proviso that at least one of the radicals $R_7$, $R_8$, $R_9$, $R_{10}$ and $R_{11}$ is hydrogen, $R_{12}$ is hydroxyl, halogen, nitro, cyano, $CF_3$, $C_1$–$C_{25}$alkyl, $C_2$–$C_{25}$alkyl which is interrupted by oxygen or sulfur; $C_1$–$C_{25}$haloalkyl, $C_1$–$C_{18}$alkoxy, $C_2$–$C_{18}$alkoxy which is interrupted by oxgyen or sulfur; $C_1$–$C_{18}$alkylthio or $C_2$–$C_{24}$alkenyl, $R_{13}$ and $R_{14}$ independently of one another are hydrogen, $C_1$–$C_{25}$alkyl, $C_1$–$C_{18}$alkoxy or —Y—$(CH_2)_s COR_6$, $R_{15}$ and $R_{16}$ independently of one another are hydrogen, $C_1$–$C_{25}$alkyl, $C_3$–$C_{25}$alkyl which is interrupted by oxygen or sulfur; $C_2$–$C_{24}$alkenyl, $C_5$–$C_{15}$cycloalkyl which is unsubstituted or substituted by $C_1$–$C_4$alkyl; phenyl or naphthyl which is unsubstituted or substituted by $C_1$–$C_4$alkyl, $X_1$ is a direct bond, oxygen, sulfur,

$C_1$–$C_{18}$alkylene, $C_2$–$C_{18}$alkylene which is interrupted by oxygen or sulfur; $C_2$–$C_{18}$alkenylene, $C_2-C_{18}$alkynylene, $C_2-C_{20}$alkylidene, $C_7-C_{20}$phenylalkylidene or $C_5-C_8$cycloalkylene, with the proviso that, if m and n are 0, $X_1$ is other than oxygen and sulfur, Y is oxygen or

$R_a$ is hydrogen or $C_1-C_8$alkyl, m and n independently of one another are integers from 0 to 10, p is an integer from 0 to 4, s is an integer from 1 to 8, and ii) an aminosilane of the formula V

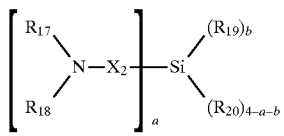 (V)

in which $R_{17}$ and $R_{18}$ independently of one another are hydrogen, $C_1-C_{25}$alkyl, 2-hydroxyethyl, $C_3-C_{25}$alkyl which is interrupted by oxygen or sulfur; $C_2-C_{24}$alkenyl or

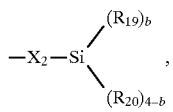

$R_{19}$ is $C_1-C_{25}$alkyl, $C_2-C_{25}$alkyl which is interrupted by oxygen or sulfur; hydroxyl, $C_1-C_{81}$alkoxy or $C_2-C_{24}$alkenyl, $R_{20}$ is hydroxyl, $C_1-C_{18}$alkoxy or $C_2-C_{18}$alkoxy which is interrupted by oxygen or sulfur; and, if a and b together are 1, three radicals $R_{20}$ together are $N(CH_2CH_2O-)_3$, $R_{21}$ is hydrogen or $C_1-C_8$alkyl, $X_2$ is $C_1-C_{18}$alkylene, $C_2-C_{20}$alkylidene, $C_7-C_{20}$phenylalkylidene, $C_5-C_8$cycloalkylene, phenylene or naphthylene which is unsubstituted or substituted by $C_1-C_4$alkyl; or is $C_4-C_{18}$alkylene which is interrupted by oxygen, sulfur or

with the proviso that two nitrogen atoms are not attached to the same carbon atom, a is 1 or 2, and b is 0, 1 or 2.

2. A coating composition according to claim 1, wherein $R_1$ is $C_1-C_{25}$alkyl, $C_2-C_{18}$alkyl which is interrupted by oxygen or sulfur; $C_2-C_{18}$alkenyl, $C_5-C_{12}$cycloalkyl which is unsubstituted or substituted by $C_1-C_4$alkyl and/or carboxyl; $C_5-C_{12}$cycloalkenyl which is unsubstituted or substituted $C_1-C_4$alkyl and/or carboxyl; $C_{13}-C_{26}$polycycloalkyl, $C_7-C_9$phenylalkyl, $-COR_6$ or a radical of the formula II, III or IV

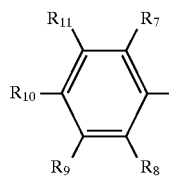 (II)

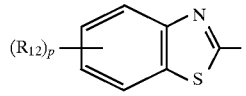 (III)

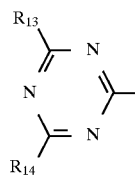 (IV)

$R_2$, $R_3$, $R_4$ and $R_5$ independently of one another are hydrogen, hydroxyl, $C_1-C_{12}$alkoxy, $C_2-C_{12}$alkoxy which is interrupted by oxygen or sulfur; $C_1-C_{18}$alkyl, $C_2-C_{18}$alkyl which is interrupted by oxygen or sulfur; $C_2-C_{18}$alkenyl, $C_5-C_{12}$cycloalkyl, $C_5-C_{12}$cycloalkenyl, phenyl, naphthyl, $C_7-C_9$phenylalkyl, $C_{10}-C_{12}$naphthylalkyl or $-COR_6$, with the proviso that, if one of the radicals $R_2$, $R_3$, $R_4$ and $R_5$ is hydroxyl, the other radical attached to the same carbon atom is other than hydroxyl; or else $R_2$ and $R_3$ or $R_4$ and $R_5$, together with the carbon atom to which they are attached, form a $C_5-C_{10}$cycloalkylidene ring, $R_6$ is hydroxyl, $C_1-C_{12}$alkoxy, $C_2-C_{12}$alkoxy which is interrupted by oxygen or sulfur; or is

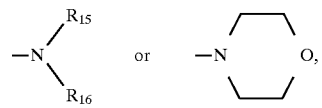

$R_7$, $R_8$, $R_9$, $R_{10}$ and $R_{11}$ independently of one another are hydrogen, hydroxyl, halogen, nitro, cyano, $CF_3$, $-COR_6$, $C_1-C_{18}$alkyl, $C_2-C_{18}$alkyl which is interrupted by oxygen or sulfur; $C_1-C_{18}$haloalkyl, $C_1-C_{12}$alkoxy, $C_2-C_{12}$alkoxy which is interrupted by oxygen or sulfur; $C_1-C_{12}$alkylthio, $C_2-C_{18}$alkenyl, $C_5-C_{12}$cycloalkyl, $C_5-C_{12}$cycloalkenyl, phenyl, naphthyl, $C_7-C_9$phenylalkyl, $C_{10}-C_{12}$naphthylalkyl, phenoxy, naphthoxy, $C_7-C_9$phenylalkoxy or $C_{10}-C_{12}$naphthylalkoxy; or else the radicals $R_8$ and $R_9$ or the radicals $R_9$ and $R_{10}$ or the radicals $R_{10}$ and $R_{11}$ or the radicals $R_7$ and $R_{11}$, together with the carbon atoms to which they are attached, form a benzo ring, with the proviso that at least one of the radicals $R_7$, $R_8$, $R_9$, $R_{10}$ or $R_{11}$ and hydrogen, $R_{12}$ is hydroxyl, chlorine, nitro, cyano, $CF_3$, $C_1-C_{18}$alkyl, $C_2-C_{18}$alkyl which is interrupted by oxygen or sulfur; $C_1-C_{18}$haloalkyl, $C_1-C_{12}$alkoxy, $C_2-C_{12}$alkoxy which is interrupted by oxygen or sulfur; $C_1-C_{12}$alkylthio or $C_2-C_{18}$alkenyl, $R_{13}$ and $R_{14}$ independently of one another are hydrogen, $C_1-C_{18}$alkyl, $C_1-C_{12}$alkoxy or $-Y-(CH_2)_sCOR_6$, $R_{15}$ and $R_{16}$ independently of one another are hydrogen, $C_1-C_{18}$alkyl, $C_3-C_{18}$alkyl which is interrupted by oxygen or sulfur; $C_2-C_{18}$alkenyl, $C_5-C_{12}$cycloalkyl, phenyl or naphthyl, $R_{17}$ and $R_{18}$ independently of one another are hydrogen, $C_1$–$C_{18}$alkyl, $C_3$–$C_{18}$alkyl which is interrupted by oxygen or sulfur; or is $C_2$–$C_{18}$alkenyl, $R_{19}$ is $C_1$–$C_{18}$alkyl, $C_2$–$C_{18}$alkyl which is interrupted by oxygen or sulfur; hydroxyl, $C_1$–$C_{12}$alkoxy or $C_2$–$C_{18}$alkenyl, $R_{20}$ is hydroxyl, $C_1$–$C_{12}$alkoxy or $C_2$–$C_{12}$alkoxy which is interrupted by oxygen or sulfur; and, if a and b together are 1, three radicals $R_{20}$ together are $N(CH_2CH_2O-)_3$, $R_{21}$ is hydrogen or $C_1$–$C_6$alkyl, $X_1$ is a direct bond, oxygen, sulfur,

$C_1$–$C_{12}$alkylene, $C_2$–$C_{12}$alkylene which is interrupted by oxygen or sulfur; $C_2$–$C_{12}$alkenylene, $C_2$–$C_{12}$alkynylene, $C_2$–$C_{16}$alkylidene, $C_7$–$C_{16}$phenylalkylidene or $C_5$–$C_8$cycloalkylene, with the proviso that, if m and n are 0, $X_1$ is other than oxygen and sulfur, $X_2$ is $C_2$–$C_{12}$alkylene, $C_2$–$C_{16}$alkylidene, $C_7$–$C_{16}$phenylalkylidene, $C_5$–$C_8$cycloalkylene, phenylene, naphthylene, or $C_4$–$C_{12}$alkylene which is interrupted by oxygen, sulfur or

with the proviso that two nitrogen atoms are not attached to the same carbon atom, Y is oxygen or

$R_a$ is hydrogen or $C_1$–$C_6$alkyl, m and n independently of one another are integers from 0 to 8, p is an integer from 0 to 2, and s is an integer from 1 to 6.

3. A coating composition according to claim 1, wherein $R_1$ is $C_1$–$C_{25}$alkyl, $C_2$–$C_{12}$alkyl which is interrupted by oxygen; $C_2$–$C_{18}$alkenyl, $C_5$–$C_{12}$cycloalkyl, $C_5$–$C_{12}$cycloalkenyl which is unsubstituted or substituted by $C_1$–$C_4$alkyl and/or carboxyl; $C_7$–$C_9$phenylalkyl, $-COR_6$ or a radical of the formula II or III

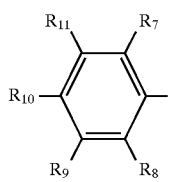

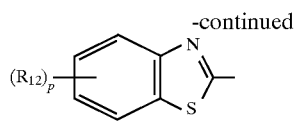

$R_2$, $R_3$, $R_4$ and $R_5$ independently of one another are hydrogen, $C_1$–$C_8$alkoxy, $C_1$–$C_{18}$alkyl, $C_2$–$C_{12}$alkyl which is interrupted by oxygen; $C_2$–$C_{12}$alkenyl, $C_5$–$C_8$cycloalkyl, $C_5$–$C_8$cycloalkenyl, phenyl, naphthyl, benzyl or $-COR_6$, or else $R_2$ and $R_3$ or $R_4$ and $R_5$, together with the carbon atom to which they are attached, form a $C_5$–$C_7$cycloalkylidene ring, $R_6$ is hydroxyl, $C_1$–$C_{12}$alkoxy, $C_2$–$C_{12}$alkoxy which is interrupted by oxygen or sulfur; or is

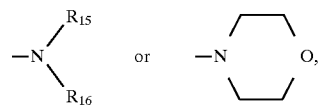

$R_7$, $R_8$, $R_9$, $R_{10}$ and $R_{11}$ independently of one another are hydrogen, hydroxyl, chlorine, nitro, $-COR_6$, $C_1$–$C_{12}$alkyl, $C_2$–$C_{12}$alkyl which is interrupted by oxygen; $C_1$–$C_8$alkoxy, $C_1$–$C_8$alkylthio, $C_2$–$C_{12}$alkenyl, $C_5$–$C_8$cycloalkyl, $C_5$–$C_8$cycloalkenyl, phenyl, naphthyl, benzyl, phenoxy, naphthoxy or benzyloxy; or else the radicals $R_9$ and $R_{10}$ or the radicals $R_{10}$ and $R_{11}$ together with the carbon atoms to which they are attached, form a benzo ring, with the proviso that at least one of the radicals $R_7$, $R_8$, $R_9$, $R_{10}$ and $R_{11}$ is hydrogen, $R_{12}$ is hydroxyl, chlorine, $C_1$–$C_{12}$alkyl, $C_1$–$C_{12}$alkoxy, $C_2$–$C_{12}$alkoxy which is interrupted by oxygen, $R_{15}$ and $R_{16}$ independently of one another are hydrogen, $C_1$–$C_{12}$alkyl, $C_2$–$C_{12}$alkenyl, $C_5$–$C_7$cycloalkyl, phenyl or naphthyl, $X_1$ is a direct bond, sulfur,

$C_1$–$C_{12}$alkylene, $C_2$–$C_{12}$alkylene which is interrupted by oxygen; $C_2$–$C_{12}$alkenylene or $C_5$–$C_8$cycloalkylene, with the proviso that, if m and n are 0, $X_1$ is other than sulfur, m and n independently of one another are integers from 0 to 8, and p is an integer from 0 to 2.

4. A coating composition according to claim 1, wherein $R_1$ is $C_1$–$C_{25}$alkyl, $C_2$–$C_{18}$alkenyl, $C_5$–$C_8$cycloalkyl, $C_5$–$C_8$cycloalkenyl which is unsubstituted or substituted by $C_1$–$C_4$alkyl and/or carboxyl; benzyl, $-COR_6$ or a radical of the formula II or III

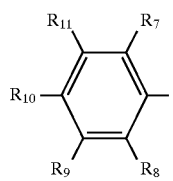

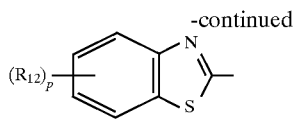 (III)

$R_2$, $R_3$, $R_4$ and $R_5$ independently of one another are hydrogen, $C_1$–$C_{12}$alkyl, $C_2$–$C_{12}$alkenyl, cyclohexyl, phenyl, naphthyl, benzyl or —$COR_6$, $R_6$ is hydroxyl, $C_1$–$C_8$alkoxy or

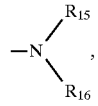

$R_7$ is hydrogen, chlorine or $C_1$–$C_4$alkyl,
$R_8$ is hydrogen, hydroxyl, $C_1$–$C_4$alkyl, nitro or chlorine,
$R_9$ is hydrogen or $C_1$–$C_4$alkyl,
$R_{10}$ is hydrogen, $C_1$–$C_4$alkyl, nitro, chlorine or —$COR_6$,
$R_{11}$ is hydrogen or $C_1$–$C_4$alkyl,
$R_{12}$ is chlorine, $C_1$–$C_8$alkyl or $C_1$–$C_8$alkoxy,
$R_{15}$ and $R_{16}$ independently of one another are hydrogen or $C_1$–$C_4$alkyl,
$X_1$ is a direct bond, sulfur,

or $C_1$–$C_{10}$alkylene, with the proviso that, if m and n are 0, $X_1$ is other than sulfur,
m and n independently of one another are integers from 0 to 4, and
p is 1.

5. A coating composition according to claim 1, wherein
$R_{17}$ and $R_{18}$ independently of one another are hydrogen, $C_1$–$C_{12}$alkyl, $C_3$–$C_{12}$alkyl which is interrupted by oxygen; or $C_2$–$C_{12}$alkenyl,
$R_{19}$ is $C_1$–$C_{12}$alkyl, $C_3$–$C_{12}$alkyl which is interrupted by oxygen; hydroxyl, $C_1$–$C_{10}$alkoxy or $C_2$–$C_{12}$alkenyl,
$R_{20}$ is hydroxyl, $C_1$–$C_{10}$alkoxy or $C_2$–$C_{10}$alkoxy which is interrupted by oxygen; and, if a and b together are 1, three radicals $R_{20}$ together are N(CH$_2$CH$_2$O—)$_3$,
$R_{21}$ is hydrogen or $C_1$–$C_4$alkyl,
$X_2$ is $C_2$–$C_{10}$alkylene, $C_2$–$C_{12}$alkylidene, $C_5$–$C_8$cycloalkylene, phenylene, or $C_4$–$C_{12}$alkylene which is interrupted by

with the proviso that two nitrogen atoms are not attached to the same carbon atom.

6. A coating composition according to claim 1, wherein
$R_{17}$ and $R_{18}$ independently of one another are hydrogen or $C_1$–$C_8$alkyl,
$R_{19}$ is $C_1$–$C_8$alkyl, hydroxyl, $C_1$–$C_8$alkoxy or $C_2$–$C_8$alkenyl,
$R_{20}$ is hydroxyl or $C_1$–$C_8$alkoxy; and, if a and b together are 1, three radicals $R_{20}$ together are N(CH$_2$CH$_2$O—)$_3$, $R_{21}$ is hydrogen or $C_1$–$C_4$alkyl,
$X_2$ is $C_2$–$C_6$alkylene, $C_5$–$C_8$cycloalkylene, phenylene, or $C_4$–$C_8$alkylene which is interrupted by

with the proviso that two nitrogen atoms are not attached to the same carbon atom,
a is 1, and
b is 0 or 1.

7. A coating composition as claimed in claim 1, wherein
$R_1$ is $C_1$–$C_{25}$alkyl, $C_2$–$C_{16}$alkenyl, 2-carboxy-4-methylcyclohexenyl, cyclohexyl, benzyl, —$COR_6$ or a radical of the formula II or III

 (II)

 (III)

$R_2$, $R_3$, $R_4$ and $R_5$ independently of one another are hydrogen, $C_1$–$C_8$alkyl, phenyl, benzyl or —$COR_6$,
$R_6$ is hydroxyl, $C_1$–$C_4$alkoxy or

$R_7$ is hydrogen or $C_1$–$C_4$alkyl,
$R_8$ is hydrogen, hydroxyl, $C_1$–$C_4$alkyl, nitro or chlorine,
$R_9$ is hydrogen or $C_1$–$C_4$alkyl,
$R_{10}$ is hydrogen, $C_1$–$C_4$alkyl, nitro, chlorine or —$COR_6$,
$R_{11}$ is hydrogen or $C_1$–$C_4$alkyl,
$R_{12}$ is chlorine, $C_1$–$C_4$alkyl or $C_1$–$C_4$alkoxy,
$R_{15}$ and $R_{16}$ independently of one another are hydrogen or $C_1$–$C_4$alkyl,
$R_{17}$ and $R_{18}$ independently of one another are hydrogen or $C_1$–$C_4$alkyl,
$R_{19}$ is $C_1$–$C_6$alkyl, $C_2$–$C_6$alkenyl, hydroxyl or $C_1$–$C_4$alkoxy,
$R_{20}$ is hydroxyl or $C_1$–$C_4$alkoxy, and, if a and b together are 1, three radicals $R_{20}$ together are N(CH$_2$CH$_2$O—)$_3$,
$R_{21}$ is hydrogen or $C_1$–$C_4$alkyl,
$X_1$ is a direct bond, sulfur,

or $C_1$–$C_{10}$alkylene, with the proviso that, if m and n are 0, $X_1$ is other than sulfur,
$X_2$ is $C_2$–$C_6$alkylene, cyclohexylene, or $C_4$–$C_8$alkylene which is interrupted by

with the proviso that two nitrogen atoms are not attached to the same carbon atom,
a is 1,
b is 0 or 1,
m and n independently of one another are 0, 1 or 2, and
p is 0 or 1.

8. A coating composition according to claim 1, wherein $R_1$ is $C_1$–$C_{18}$alkyl, 2-carboxy-4-methylcyclohexenyl, —$COR_6$ or a radical of the formula II or III

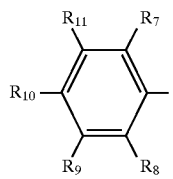

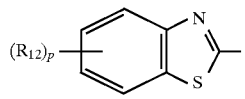

$R_2$ is hydrogen,
$R_3$ is hydrogen or —$COR_6$,
$R_4$ and $R_5$ are hydrogen,
$R_6$ is hydroxyl,
$R_7$ is hydrogen,
$R_8$ is hydrogen, hydroxyl, $C_1$–$C_4$alkyl, nitro or chlorine,
$R_9$ is hydrogen,
$R_{10}$ is hydrogen, $C_1$–$C_4$alkyl or nitro,
$R_{11}$ is hydrogen,
$R_{17}$ and $R_{18}$ are hydrogen or methyl,
$R_{19}$ is $C_1$–$C_4$alkyl, hydroxyl or $C_1$–$C_4$alkoxy,
$R_{20}$ is hydroxyl or $C_1$–$C_4$alkoxy, and, if a and b together are 1, three radicals $R_{20}$ together are $N(CH_2CH_2O—)_3$,
$R_{21}$ is hydrogen,
$X_1$ is a direct bond, sulfur,

or $C_1$–$C_8$alkylene, with the proviso that, if m and n are 0, $X_1$ is other than sulfur,
$X_2$ is $C_2$–$C_4$alkylene, or $C_4$–$C_6$alkylene which is interrupted by

with the proviso that two nitrogen atoms are not attached to the same carbon atom,
a is 1,
b is 0 or 1,
m and n independently of one another are 0 or 1, and
p is 0.

9. A coating composition according to claim 1, wherein component (β) is derived from an aminosilane of the formula V in which at least one of the radicals $R_{17}$ and $R_{18}$ is hydrogen.

10. A coating composition according to claim 1, wherein component (α) is formed in situ during the preparation of the coating composition by separate addition of components (i) and (ii) and subsequent mixing of the coating composition.

11. A coating composition according to claim 1, wherein the coating composition is a paint system.

12. A coating composition according to claim 1, wherein the coating composition is an aqueous paint system.

13. A coating composition according to claim 1, wherein component a) is an epoxy resin, a polyurethane resin, a polyester resin, an acrylic resin, an acrylic copolymer resin, a polyvinyl resin, a phenolic resin, an alkyd resin or a mixture of such resins.

14. A coating composition according to claim 1, which additionally comprises one or more components selected from the group consisting of pigments, dyes, fillers, flow control agents, dispersants, thixotropic agents, adhesion promoters, antioxidants, light stabilizers and curing catalysts.

15. A coating composition according to claim 1, wherein component (b) is present in a quantity of from 0.01 to 20% based on the weight of the overall solids content of the coating composition.

16. A process for preparing a coating composition according to claim 1, which comprises
mixing an organic film-forming binder with at least one carboxylic acid of the formula I and with at least one aminosilane of the formula V forming a salt (α).

17. A salt derived from i) a polyacrylic acid, an acrylic acid-maleic acid copolymer or a carboxylic acid of the formula I

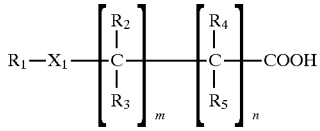

in which
$R_1$ is hydrogen, $C_1$–$C_{25}$alkyl, $C_2$–$C_{25}$alkyl which is interrupted by oxygen or sulfur; $C_2$–$C_{24}$alkenyl, $C_4$–$C_{15}$cycloalkyl which is unsubstituted or substituted by $C_1$–$C_4$alkyl and/or carboxyl; $C_5$–$C_{15}$cycloalkenyl which is unsubstituted or substituted by $C_1$–$C_4$alkyl and/or carboxyl; $C_{13}$–$C_{26}$polycycloalkyl, $C_7$–$C_9$phenylalkyl which is unsubstituted or substituted on the phenyl zing by $C_1$–$C_4$alkyl; —$COR_6$, a 5- or 6-membered heterocyclic ring which is unsubstituted or substituted by $C_1$–$C_4$alkyl, $C_1$–$C_4$alkoxy, halogen or carboxyl; a 5- or 6-membered heterocyclic ring which is benzo-fused and is unsubstituted or substituted by $C_1$–$C_4$alkyl, $C_1$–$C_4$alkoxy, halogen or carboxyl; or else $R_1$ is a radical of the formula II, III or IV

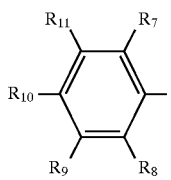

-continued

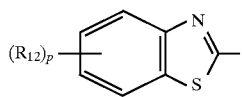

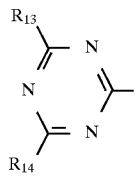

$R_2$, $R_3$, $R_4$ and $R_5$ independently of one another are hydrogen, hydroxyl, $C_1$–$C_{18}$alkoxy, $C_2$–$C_{18}$alkoxy which is interrupted by oxygen or sulfur; $C_1$–$C_{25}$allyl, $C_2$–$C_{25}$alkyl which is interrupted by oxygen or sulfur; $C_2$–$C_{24}$alkenyl, $C_5$–$C_{15}$cycloalkyl which is unsubstituted or substituted by $C_1$–$C_4$alkyl; $C_5$–$C_{15}$cycloalkenyl which is unsubstituted or substituted by $C_1$–$C_4$alkyl; phenyl or naphthyl which is unsubstituted or substituted by $C_1$–$C_4$alkyl; $C_7$–$C_9$phenylalkyl which is unsubstituted or substituted on the phenyl ring by $C_1$–$C_4$alkyl; $C_{10}$–$C_{12}$naphthylalkyl which is unsubstituted or substituted on the naphthyl ring system by $C_1$–$C_4$alkyl; or are —$COR_6$, with the proviso that, if one of the radicals $R_2$, $R_3$, $R_4$ and $R_5$ is hydroxyl, the other radical attached to the same carbon atom is other than hydroxyl; or else $R_2$ and $R_3$ or $R_4$ and $R_5$, together with the carbon atom to which they are attached, form an unsubstituted or $C_1$–$C_4$alkyl-substituted $C_5$–$C_{12}$cycloalkylidene ring, $R_6$ is hydroxyl, $C_1$–$C_{18}$alkoxy, $C_2$–$C_{18}$alkoxy which is interrupted by oxygen or sulfur; or is

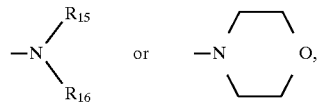

$R_7$, $R_8$, $R_9$, $R_{10}$ and $R_{11}$ independently of one another are hydrogen, hydroxyl, halogen, nitro, cyano, $CF_3$, —$COR_6$, $C_1$–$C_{25}$alkyl, $C_2$–$C_{25}$alkyl which is interrupted by oxygen or sulfur; $C_1$–$C_{25}$haloalkyl, $C_1$–$C_{18}$alkoxy, $C_2$–$C_{18}$alkoxy which is interrupted by oxygen or sulfur; $C_1$–$C_{18}$alkylthio, $C_2$–$C_{24}$alkenyl, $C_5$–$C_{15}$cycloalkyl which is unsubstituted or substituted by $C_1$–$C_4$alkyl; $C_5$–$C_{15}$cycloalkenyl which is unsubstituted or substituted by $C_1$–$C_4$alkyl; phenyl or naphthyl which is unsubstituted or substituted by $C_1$–$C_4$alkyl; $C_7$–$C_9$phenylalkyl which is unsubstituted or substituted on the phenyl ring by $C_1$–$C_4$alkyl; $C_{10}$–$C_{12}$naphthylalkyl which is unsubstituted or substituted on the naphthyl ring system by $C_1$–$C_4$alkyl; phenoxy or naphthoxy which is unsubstituted or substituted by $C_1$–$C_4$alkyl; $C_7$–$C_9$phenylalkoxy which is unsubstituted or substituted on the phenyl ring by $C_1$–$C_4$alkyl; $C_{10}$–$C_{12}$naphthylalkoxy which is unsubstituted or substituted on the naphthyl ring system by $C_1$–$C_4$alkyl; or else the radicals $R_8$ and $R_9$ or the radicals $R_9$ and $R_{10}$ or the radicals $R_{10}$ and $R_{11}$ or the radicals $R_7$ and $R_{11}$, together the carbon atoms to which they are attached, form an unsubstituted or $C_1$–$C_4$alkyl-, halogen- or $C_1$–$C_4$alkoxy-substituted benzo ring, with the proviso that at least one of the radicals $R_7$, $R_8$, $R_9$, $R_{10}$ and $R_{11}$ is hydrogen, $R_{12}$ is hydroxyl, halogen, nitro, cyano, $CF_3$, $C_1$–$C_{25}$alkyl, $C_2$–$C_{25}$alkyl which is interrupted by oxygen or sulfur; $C_1$–$C_{25}$haloalkyl, $C_1$–$C_{18}$alkoxy, $C_2$–$C_{18}$alkoxy which is interrupted by oxgyen or sulfur; $C_1$–$C_{18}$alkylthio or $C_2$–$C_{24}$alkenyl, $R_{13}$ and $R_{14}$ independently of one another are hydrogen, $C_1$–$C_{25}$alkyl, $C_1$–$C_{18}$alkoxy or —Y—$(CH_2)_s COR_6$, $R_{15}$ and $R_{16}$ independently of one another are hydrogen, $C_1$–$C_{25}$alkyl, $C_3$–$C_{25}$alkyl which is interrupted by oxygen or sulfur; $C_2$–$C_{24}$alkenyl, $C_5$–$C_{15}$cycloalkyl which is unsubstituted or substituted by $C_1$–$C_4$alkyl; phenyl or naphthyl which is unsubstituted or substituted by $C_1$–$C_4$alkyl, $X_1$ is a direct bond, oxygen, sulfur,

$C_1$–$C_{18}$alkylene, $C_2$–$C_8$alkylene which is interrupted by oxygen or sulfur; $C_2$–$C_{18}$alkenylene, $C_2$–$C_{18}$alkynylene, $C_2$–$C_{20}$alkylidene, $C_7$–$C_{20}$phenylalkylidene or $C_5$–$C_8$cycloalkylene, with the proviso that, if m and n are 0, $X_1$ is other than oxygen and sulfur, Y is oxygen or

$R_a$ is hydrogen or $C_1$–$C_8$alkyl, m and n independently of one another are integers from 0 to 10, p is an integer from 0 to 4, s is an integer from 1 to 8, and ii) an aminosilane of the formula V

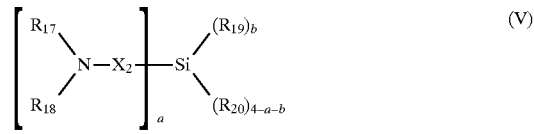

in which $R_{17}$ and $R_{18}$ independently of one another are hydrogen, $C_1$–$C_{25}$alkyl, 2-hydroxyethyl, $C_3$–$C_{25}$alkyl which is interrupted by oxygen or sulfur; $C_2$–$C_{24}$alkenyl or

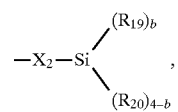

$R_{19}$ is $C_1$–$C_{25}$alkyl, $C_2$–$C_{25}$alkyl which is interrupted by oxygen or sulfur; hydroxyl, $C_1$–$C_{18}$alkoxy or $C_2$–$C_{24}$alkenyl, $R_{20}$ is hydroxyl, $C_1$–$C_{18}$alkoxy or $C_2$–$C_{18}$alkoxy which is interrupted by oxygen or sulfur; and, if a and b together are 1, three radicals $R_{20}$ together are $N(CH_2CH_2O—)_3$, $R_{21}$ is hydrogen or $C_1$–$C_8$alkyl, $X_2$ is $C_1$–$C_{18}$alkylene, $C_2$–$C_{20}$alkylidene, $C_7$–$C_{20}$phenylalkylidene, $C_5$–$C_8$cycloalkylene, phenylene or naphthylene which is unsubstituted or substituted by $C_1$–$C_4$alkyl; or is $C_4$–$C_{18}$alkylene which is interrupted by oxygen, sulfur or

with the-proviso that two nitrogen atoms are not attached to the same carbon atom, a is 1 or 2, and b is 0, 1 or 2.

18. A salt according to claim 17, derived from i) a carboxylic acid of the formula I in which $R_1$ is hydrogen, $C_1$–$C_{25}$alkyl, $C_2$–$C_{25}$alkyl interrupted by oxygen or sulfur; $C_2$–$C_{24}$alkenyl, $C_4$–$C_{15}$cycloalkyl which is unsubstituted or substituted by $C_1$–$C_4$alkyl; $C_5$–$C_{15}$cycloalkenyl which is unsubstituted or substituted by $C_1$–$C_4$alkyl; $C_{13}$–$C_{26}$polycycloalkyl, $C_7$–$C_9$phenylalkyl which is unsubstituted or substituted on the phenyl ring by $C_1$–$C_4$alkyl; —$COR_6$, a 5- or 6-membered heterocyclic ring which is unsubstituted or substituted by $C_1$–$C_4$alkyl, $C_1$–$C_4$alkoxy, halogen or carboxyl; a 5- or 6-membered heterocyclic ring which is benzo-fused and is unsubstituted or substituted by $C_1$–$C_4$alkyl, $C_1$–$C_4$alkoxy, halogen or carboxyl; or else $R_1$ is a radical of the formula II, III or IV

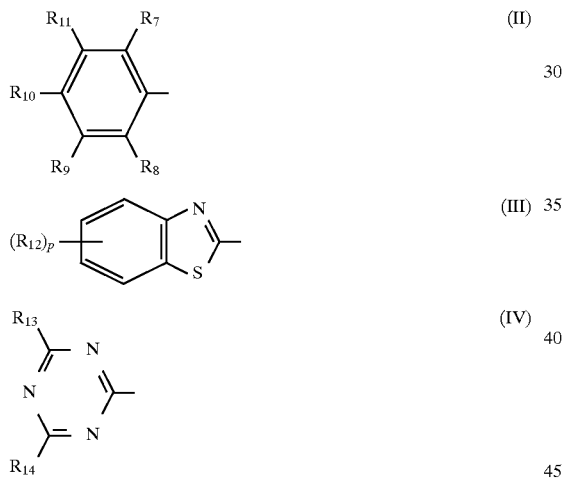

$R_2$, $R_3$, $R_4$ and $R_5$ independently of one another are hydrogen, hydroxyl, $C_1$–$C_{18}$alkoxy, $C_2$–$C_{18}$alkoxy which is interrupted by oxygen or sulfur; $C_1$–$C_{25}$alkyl, $C_2$–$C_{25}$alkyl which is interrupted by oxygen or sulfur; $C_2$–$C_{24}$alkenyl, $C_5$–$C_{15}$cycloalkyl which is unsubstituted or substituted by $C_1$–$C_4$alkyl; $C_5$–$C_{15}$cycloalkenyl which is unsubstituted or substituted by $C_1$–$C_4$alkyl; phenyl or naphthyl which is unsubstituted or substituted by $C_1$–$C_4$alkyl; $C_7$–$C_9$phenylalkyl which is unsubstituted or substituted on the phenyl ring by $C_1$–$C_4$alkyl; $C_{10}$–$C_{12}$naphthylalkyl which is unsubstituted or substituted on the naphthyl ring system by $C_1$–$C_4$alkyl; or are —$COR_6$, with the proviso that, if one of the radicals $R_2$, $R_3$, $R_4$ and $R_5$ is hydroxyl, the other radical attached to the same carbon atom is other than hydroxyl; or else $R_2$ and $R_3$ or $R_4$ and $R_5$, together with the carbon atom to which they are attached, form an unsubstituted or $C_1$–$C_4$alkyl-substituted $C_5$–$C_{12}$cycloalkylidene ring, $R_6$ is hydroxyl, $C_1$–$C_{18}$alkoxy, $C_2$–$C_{18}$alkoxy which is interrupted by oxygen or sulfur; or is

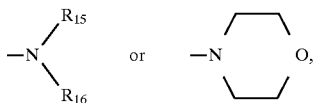

$R_7$, $R_8$, $R_9$, $R_{10}$ and $R_{11}$ independently of one another are hydrogen, hydroxyl, halogen, nitro, cyano, $CF_3$, —$COR_6$, $C_1$–$C_{25}$alkyl, $C_2$–$C_{25}$alkyl which is interrupted by oxygen or sulfur; $C_1$–$C_{25}$haloalkyl, $C_1$–$C_{18}$alkoxy, $C_2$–$C_{18}$alkoxy which is interrupted by oxygen or sulfur; $C_1$–$C_{18}$alkylthio, $C_2$–$C_{24}$alkenyl, $C_5$–$C_{15}$cycloalkyl which is unsubstituted or substituted by $C_1$–$C_4$alkyl; $C_5$–$C_{15}$cycloalkenyl which is unsubstituted or substituted by $C_1$–$C_4$alkyl; phenyl or naphthyl which is unsubstituted or substituted by $C_1$–$C_4$alkyl; $C_7$–$C_9$phenylalkyl which is unsubstituted or substituted on the phenyl ring by $C_1$–$C_4$alkyl; $C_{10}$–$C_{12}$naphthylalkyl which is unsubstituted or substituted on the naphthyl ring system by $C_1$–$C_4$alkyl; phenoxy or naphthoxy which is unsubstituted or substituted by $C_1$–$C_4$alkyl; $C_7$–$C_9$phenylalkoxy which is unsubstituted or substituted on the phenyl ring by $C_1$–$C_4$alkyl; $C_{10}$–$C_{12}$naphthylalkoxy which is unsubstituted or substituted on the naphthyl ring system by $C_1$–$C_4$alkyl; or else the radicals $R_8$ and $R_9$ or the radicals $R_9$ and $R_{10}$ or the radicals $R_{10}$ and $R_{11}$ or the radicals $R_7$ and $R_{11}$, together the carbon atoms to which they are attached, form an unsubstituted or $C_1$–$C_4$alkyl-, halogen- or $C_1$–$C_4$alkoxy-substituted benzo ring, with the proviso that at least one of the radicals $R_7$, $R_8$, $R_9$, $R_{10}$ and $R_{11}$ is hydrogen, $R_{12}$ is hydroxyl, halogen, nitro, cyano, $CF_3$, $C_1$–$C_{25}$alkyl, $C_2$–$C_{25}$alkyl which is interrupted by oxygen or sulfur; $C_1$–$C_{25}$haloalkyl, $C_1$–$C_{18}$alkoxy, $C_2$–$C_{15}$alkoxy which is interrupted by oxgyen or sulfur; $C_1$–$C_{18}$alkylthio or $C_2$–$C_{24}$alkenyl, $R_{13}$ and $R_{14}$ independently of one another are hydrogen, $C_1$–$C_{25}$allyl, $C_1$–$C_{18}$alkoxy or —O—$(CH_2)_sCOR_6$, $R_{15}$ and $R_{16}$ independently of one another are hydrogen, $C_1$–$C_{25}$alkyl, $C_3$–$C_{25}$alkyl which is interrupted by oxygen or sulfur; $C_2$–$C_{24}$alkenyl, $C_5$–$C_{15}$cycloalkyl which is unsubstituted or substituted by $C_1$–$C_4$alkyl; phenyl or naphthyl which is unsubstituted or substituted by $C_1$–$C_4$alkyl, $X_1$ is a direct bond, oxygen, sulfur,

$C_1$–$C_{18}$alkylene, $C_2$–$C_{18}$alkylene which is interrupted by oxygen or sulfur; $C_2$–$C_{18}$alkenylene, $C_2$–$C_{18}$alkynylene, $C_2$–$C_{20}$alkylidene, $C_7$–$C_{20}$phenylalkylidene or $C_5$–$C_8$cycloalkylene, with the proviso that, if m and n are 0, $X_1$ is other than oxygen and sulfur, m and n independently of one another are integers from 0 to 10, p is an integer from 0 to 4, s is an integer from 1 to 8, and ii) an aminosilane of the formula V in which $R_{17}$ and $R_{18}$ independently of one another are hydrogen, $C_1$–$C_{25}$alkyl, 2-hydroxyethyl, $C_3$–$C_{25}$alkyl which is interrupted by oxygen or sulfur; or is $C_2$–$C_{24}$alkenyl or $$-X_2-Si\begin{matrix}(R_{19})_b\\ \\(R_{20})_{4-b}\end{matrix},$$

$R_{19}$ is $C_1$–$C_{25}$alkyl, $C_2$–$C_{25}$alkyl which is interrupted by oxygen or sulfur; or $C_2$–$C_{24}$alkenyl, $R_{20}$ is hydroxyl, $C_1$–$C_{18}$alkoxy or $C_2$–$C_{18}$alkoxy which is interrupted by oxygen or sulfur;

$R_{21}$ is hydrogen or $C_1$–$C_8$alkyl, $X_2$ is $C_1$–$C_{18}$alkylene, $C_2$–$C_{20}$alkylidene, $C_7$–$C_{20}$phenylalkylidene, $C_5$–$C_8$cycloalkylene, phenylene or naphthylene which is unsubstituted or substituted by $C_1$–$C_4$alkyl; or is $C_4$–$C_{18}$alkylene which is interrupted by oxygen, sulfur or $$\begin{matrix}\diagdown\\N-R_{21},\\\diagup\end{matrix}$$

with the proviso that two nitrogen atoms are not attached to the same carbon atom, a is 1 or 2, and b is 0, 1 or 2.

19. A salt according to claim 17, wherein $R_1$ is $C_1$–$C_{25}$alkyl, $C_2$–$C_{16}$alkenyl, 2-carboxy-4-methylcyclohexenyl, cyclohexyl, benzyl, —$COR_6$ or a radical of the formula II or III (II)

(III)

$R_2$, $R_3$, $R_4$ and $R_5$ independently of one another are hydrogen, $C_1$–$C_8$alkyl, phenyl, benzyl or —$COR_6$, $R_6$ is hydroxyl, $C_1$–$C_4$alkoxy or $$-N\begin{matrix}\diagup R_{15}\\ \\ \diagdown R_{16}\end{matrix},$$

$R_7$ is hydrogen or $C_1$–$C_4$alkyl, $R_8$ is hydrogen, hydroxyl, $C_1$–$C_4$alkyl, nitro or chlorine, $R_9$ is hydrogen or $C_1$–$C_4$alkyl, $R_{10}$ is hydrogen, $C_1$–$C_4$alkyl, nitro, chlorine or —$COR_6$, $R_{11}$ is hydrogen or $C_1$–$C_4$alkyl, $R_{12}$ is chlorine, $C_1$–$C_4$alkyl or $C_1$–$C_4$alkoxy, $R_{15}$ and $R_{16}$ independently of one another are hydrogen or $C_1$–$C_4$alkyl, $R_{17}$ and $R_{18}$ independently of one another are hydrogen or $C_1$–$C_4$alkyl, $R_{19}$ is $C_1$–$C_6$alkyl, $C_2$–$C_6$alkenyl, hydroxyl or $C_1$–$C_4$alkoxy, $R_{20}$ is hydroxyl or $C_1$–$C_4$alkoxy, and, if a and b together are 1, three radicals $R_{20}$ together are $N(CH_2CH_2O—)_3$, $R_{21}$ is hydrogen or $C_1$–$C_4$alkyl, $X_1$ is a direct bond, sulfur, $$\begin{matrix}\diagdown\\C=O\\\diagup\end{matrix}$$

or $C_1$–$C_{10}$alkylene, with the proviso that, if m and n are 0, $X_1$ is other than sulfur, $X_2$ is $C_2$–$C_6$alkylene, cyclohexylene, or $C_4$–$C_8$alkylene which is interrupted by $$\begin{matrix}\diagdown\\N-R_{21},\\\diagup\end{matrix}$$

with the proviso that two nitrogen atoms are not attached to the same carbon atom, a is 1, b is 0 or 1, m and n independently of one another are 0, 1 or 2, and p is 0 or 1.

20. A salt according to claim 17, wherein $R_1$ is $C_1$–$C_{18}$alkyl, 2-carboxy-4-methylcyclohexenyl, —$COR_6$ or a radical of the formula II or III (II)

(III)

$R_2$ is hydrogen, $R_3$ is hydrogen or —$COR_6$, $R_4$ and $R_5$ are hydrogen, $R_6$ is hydroxyl, $R_7$ is hydrogen, $R_8$ is hydrogen, hydroxyl, $C_1$–$C_4$alkyl, nitro or chlorine, $R_9$ is hydrogen, $R_{10}$ is hydrogen, $C_1$–$C_4$alkyl or nitro, $R_{11}$ is hydrogen, $R_{17}$ and $R_{18}$ are hydrogen or methyl, $R_{19}$ is $C_1$–$C_4$alkyl, hydroxyl or $C_1$–$C_4$alkoxy, $R_{20}$ is hydroxyl or $C_1$–$C_4$alkoxy, and, if a and b together are 1, three radicals $R_{20}$ together are $N(CH_2CH_2O—)_3$, $R_{21}$ is hydrogen, $X_1$ is a direct bond, sulfur, $$\begin{matrix}\diagdown\\C=O\\\diagup\end{matrix}$$

or $C_1$–$C_8$alkylene, with the proviso that, if m and n are 0, $X_1$ is other than sulfur, $X_2$ is $C_2$–$C_4$alkylene, or $C_4$–$C_6$alkylene which is interrupted by

with the proviso that two nitrogen atoms are not attached to the same carbon atom, a is 1, b is 0 or 1, m and n independently of one another are 0 or 1, and p is 0.

21. A method for protecting a metal surface from corrosion, which comprises applying thereto a composition according to claim 1 and then drying and/or curing the composition.

* * * * *